(12) United States Patent
Nozawa et al.

(10) Patent No.: US 7,075,735 B2
(45) Date of Patent: Jul. 11, 2006

(54) STEREO IMAGING SYSTEM

(75) Inventors: Toshihide Nozawa, Hachioji (JP);
Kazuhiko Arai, Hachioji (JP); Takashi Miyoshi, Atsugi (JP); Hidekazu Iwaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 46 days.

(21) Appl. No.: 10/853,003

(22) Filed: May 25, 2004

(65) Prior Publication Data
US 2005/0057806 A1    Mar. 17, 2005

(30) Foreign Application Priority Data
May 27, 2003 (JP) ............................. 2003-148700
May 27, 2003 (JP) ............................. 2003-148701
May 27, 2003 (JP) ............................. 2003-148702

(51) Int. Cl.
*G02B 17/00* (2006.01)
*G02B 27/22* (2006.01)
*G02B 13/04* (2006.01)

(52) U.S. Cl. ..................... 359/726; 359/462; 359/749

(58) Field of Classification Search ............... 359/462, 359/726, 749
See application file for complete search history.

(56) References Cited

U.S. PATENT DOCUMENTS 6,898,022 B1 * 5/2005 Igarashi ................. 359/676
2005/0185050 A1 * 8/2005 Ohashi .................... 348/50

FOREIGN PATENT DOCUMENTS

JP    07-134345    5/1995
JP    08-171151    7/1996

* cited by examiner

*Primary Examiner*—Scott J. Sugarman
(74) *Attorney, Agent, or Firm*—Kenyon & Kenyon LLP

(57) ABSTRACT

The invention relates to a stereo imaging unit or system that can have a suitable degree of parallax and a wide angle of view even when used with an image pickup device smaller than film. The stereo imaging unit comprises a first entrance window 5L and a second entrance window 5R juxtaposed in the left-and-right direction, a plurality of reflecting surfaces 21L, 22L for guiding a light beam from the first entrance window 5L to a single image pickup device 4, a plurality of reflecting surfaces 21R, 22R for guiding a light beam from the second entrance window 5R to the image pickup device 4, a first negative lens group 1L for the light beam from the first entrance window 5L, a first positive lens group 3 located at an image side thereof via the longest air spacing in the lens system, a second lens group 1R for the light beam from the second entrance window 5R, and a second positive lens group 3 located on an image side thereof via the longest air spacing in the lens system, and satisfies conditions (1), (2), (3) and (4) for defining the focal lengths of the negative and positive lens groups in terms of the focal length of the overall lens system.

75 Claims, 8 Drawing Sheets

STEREO IMAGING SYSTEM

This application claims benefit of Japanese Application Nos. 2003-148700, 2003-148701 and 2003-148702 filed in Japan on May 27, 2003, the contents of which are incorporated by this reference.

BACKGROUND OF THE INVENTION

The present invention relates generally to a stereo imaging unit or system, and more particularly to a compact stereo imaging unit or system capable of phototaking stereo images having a large angle of view in the horizontal direction.

So far, a camera capable of real-time phototaking two images having parallaxes juxtaposed in the left-and-right direction for the same subject has been known in the art. Since an oblong image pickup plane is usually used for phototaking, it is general that two images are arranged side by side in the left-and-right direction. However, when it is desired to obtain horizontally long stereo images with such a phototaking arrangement, two horizontally long images must be arranged in the horizontal direction, resulting in a useless space on the image pickup plane. For instance, when two such images are simultaneously picked up by means of a single image pickup device for range finding or the like, it is difficult to obtain detailed image information.

To solve such a problem, patent publication 1 comes up with a stereo imaging optical system for capturing stereo images on an oblong image pickup plane in the vertical direction.

In this optical system, a film plane is vertically divided into upper and lower areas, as shown in FIGS. 1 and 2 of patent publication 1, and left and right images having parallaxes are guided to the upper and lower areas of the film plane by ways of two reflecting surfaces for each.

FIG. 7 of patent publication 1 also shows a small-format, wide-angle stereo imaging optical system designed as a retrofocus type by locating a negative lens on the subject side.

Patent Publication 1
JP(A)8-171151

However, the phototaking optical system set forth in this publication 1 is designed exclusively for photographic film purposes; when it is used with an image pickup device having a small image pickup plane, no sufficient angle of view is obtainable, neither is any angle-of-incidence dependence specific to the image pickup device obtained.

When the optical path for the phototaking optical system is taken apart, the left and right optical systems are broken down into independent optical systems, and so it is difficult to reduce the number of lens components involved.

Besides, the phototaking optical system of patent publication 1 has a specific construction wherein the image plane is positioned on the operator side. For this reason, the size of the optical system remains large in the depth (incident) direction, as viewed overall.

With the phototaking optical system set forth in patent publication 1, it is difficult to reduce the number of lens components involved, because when an optical path is taken apart, the left and right imaging optical systems are broken down into independent optical systems.

SUMMARY OF THE INVENTION

In view of such problems with the prior art as described above, it is one object of the invention to provide a stereo imaging unit comprising a stereo imaging optical system that can afford a suitable parallax and a wide angle-of-view thereto even when used with a small-format image pickup device.

It is another object of the invention to provide a stereo imaging unit comprising a small-format stereo imaging optical system that has a large angle of view in the horizontal (parallactic) direction with a reduced number of components involved.

It is yet another object of the invention to provide a stereo imaging unit comprising a small-format stereo imaging optical system that has a large angle of view in the horizontal (parallactic) direction.

It is a further object of the invention to provide a stereo imaging unit comprising a stereo imaging optical system capable of making better correction for aberrations as well as a stereo imaging unit comprising a stereo imaging optical system capable of making efficient use of images having parallaxes on an image pickup device.

According to the first aspect of the invention, the above objects are achievable by the provision of a stereo imaging unit comprising a single image pickup device and a stereo imaging optical system capable of forming on said single image pickup device at least two parallactic images having mutual parallaxes, characterized in that said stereo imaging optical system comprises:

a first entrance window and a second entrance window that have entrance surfaces located on a subject side and are juxtaposed in a left-and-right direction, a plurality of reflecting surfaces for guiding a light beam incident on said first entrance window to said single image pickup device, a plurality of reflecting surfaces for guiding a light beam incident on said second entrance window to said single image pickup device, a first negative lens group having negative refracting power on the light beam incident on said first entrance window and a first positive lens group that is positioned on an image side of said first negative lens group via the longest air space in a lens system and has positive refracting power, and a second negative lens group having negative refracting power on the light beam incident on said second entrance window and a second positive lens group that is positioned on an image side of said second negative lens group via the longest air space in the lens system and has positive refracting power, with satisfaction of conditions (1), (2), (3) and (4):

$$-10.0 < f_{N1}/f_{1T} < -2.0 \tag{1}$$

$$-10.0 < f_{N2}/f_{2T} < -2.0 \tag{2}$$

$$1.5 < f_{P1}/f_{1T} < 10 \tag{3}$$

$$1.5 < f_{P2}/f_{2T} < 10 \tag{4}$$

where $f_{N1}$ is the focal length of said first negative lens group, $f_{N2}$ is the focal length of said second negative lens group, $f_{P1}$ is the focal length of said first positive lens group, $f_{P2}$ is the focal length of said second positive lens group, $f_{1T}$ is the focal length of the stereo imaging optical system including said first negative lens group, and $f_{2T}$ is the focal length of the stereo imaging optical system including said second negative lens group.

The advantages of, and the requirements for, the first stereo imaging unit according to the invention are now explained.

Referring first to the term "parallactic direction" used herein before giving an explanation of the invention, that term means a direction of connecting the position of a center ray incident from the same subject on the entrance surface of the first negative lens group with the position of a center ray incident on the entrance surface of the second negative lens group. Usually, a horizontal (left-and-right) direction is chosen in the invention; however, that parallactic direction is not always limited thereto, and so could be selected from any desired vertical or oblique directions. For a parallactic image on the image pickup device (an image-formation plane), a relative misalignment direction of the same subject on a plurality of parallax images is defined as that parallax direction.

The term "single image pickup device" used herein means one that has not only one single receiving plane but also a plurality of juxtaposed receiving planes on the same substrate (of usually a semiconductor material).

Referring now to the stereo imaging optical system in the stereo imaging unit of the invention, light beams entering the negative lens groups located in association with the entrance windows on the left and right sides (that, unless otherwise stated, will stand for those in the horizontal direction) are reflected at the associated plurality of reflecting surfaces on the way to the image pickup device, with images having parallaxes (parallax images) guided onto the image pickup device by way of the image-formation lens groups.

If, in this case, the left and right optical systems is generally configured as a retrofocus type with the negative lens groups equivalent to objective lens groups and the positive lens groups located on the image plane side and having an image-formation action, it is then possible to achieve a wide angle-of-view arrangement.

Conditions (1), (2), (3) and (4) are provided to define the focal length of each negative lens group and the focal length of each positive lens group in terms of the focal length of the whole optical system so as to obtain parallax images having a suitable angle of view and a suitable parallax even when used with an image pickup device of small size.

As the lower limit of −10.0 to conditions (1) and (2) is not reached or the refracting power of each negative lens group becomes weak, any desired wide angle of view cannot be obtained with an increase in the diameter of the negative lens group.

On the other hand, as the upper limit of −2.0 to conditions (1) and (2) is exceeded, the spacing between both the lens groups becomes narrow, rendering it difficult to bend an optical path in such a way as to have a suitable parallax.

Again, as the lower limit of 1.5 to conditions (3) and (4) is not reached or the refracting power of each positive lens group becomes weak, the spacing between both the lens groups becomes narrow, and as the upper limit of 10 thereto is exceeded or the refracting power of the positive lens group becomes small, the spacing between both the lens groups becomes too wide, resulting in a bulky unit.

The lower limit to condition (1), and (2) should be set at preferably −8.0, and more preferably −6.0.

The upper limit to condition (1), and (2) should be set at preferably −3.0, and more preferably −4.0.

The lower limit to condition (3), and (4) should be set at preferably 2.5, and more preferably 3.0.

The upper limit to condition (3), and (4) should be set at preferably 7.0, and more preferably 5.0.

According to the second aspect of the invention, the first stereo imaging unit is further characterized by satisfying conditions (5) and (6):

$$-0.4 < \beta_{P1} < -0.06 \quad (5)$$

$$-0.4 < \beta_{P2} < -0.06 \quad (6)$$

where $\beta_{P1}$ is the transverse magnification of said first positive lens group, and $\beta_{P2}$ is the transverse magnification of said second positive lens group.

The advantages of, and the requirements for, the second stereo imaging unit are now explained.

Conditions (5) and (6) are provided to define the transverse magnifications of the positive lens groups. As the lower limit of −0.4 to condition (5), and (6) is not reached, there is an increased back focus, leading to a bulky optical system. On the other hand, as the upper limit of −0.06 to condition (5), and (6) is exceeded, any wide-angle arrangement is unachievable and the diameter of the negative lens group becomes too large, because the refracting power of the negative lens group becomes weak.

The lower limit to condition (5), and (6) should be set at preferably −0.3, and more preferably −0.25.

The upper limit to condition (5), and (6) should be set at preferably −0.1, and more preferably −0.15.

Enumerated below are the values of conditions (1) to (6) in the stereo imaging optical systems in the example to be given later.

$f_{N1} = -22.908$
$f_{N2} = -22.908$
$f_{P1} = 18.714$
$f_{P2} = 18.714$
$f_{1T} = 5.00$
$f_{2T} = 5.00$
$f_{N1}/f_{1T} = -4.57$
$f_{N2}/f_{2T} = -4.57$
$f_{P1}/f_{1T} = 3.74$
$f_{P2}/f_{2T} = 3.74$
$\beta_{P1} = -0.218$
$\beta_{P2} = -0.218$ According to the third aspect of the invention, the first or second stereo imaging unit is further characterized in that a stop member to form an exit pupil is positioned in the spacing between said first negative lens group and said first positive lens group, and between said second negative lens group and said second positive lens group.

The advantages of, and the requirements for, the third stereo imaging unit are now explained.

With this arrangement, it is easy to make a light beam incident on the image pickup device telecentric, and it is possible to prevent the negative and positive lens groups from having increased diameters.

According to the fourth aspect of the invention, the third stereo imaging unit is further characterized by satisfaction of conditions (7) and (8) while an optical path is taken apart:

$$0.03 < D_{PP1}/f_{P1} < 1.5 \quad (7)$$

$$0.03 < D_{PP2}/f_{P2} < 1.5 \quad (8)$$

where $D_{PP1}$ is the distance from said stop member to the entrance surface of said first positive lens group, and $D_{PP2}$ is the distance from said stop member to the entrance surface of said second positive lens group.

The requirements for the fourth stereo imaging unit are now explained.

As the lower limit of 0.3 to condition (7), and (8) is not reached, there is a tenuous effect on making the optical system telecentric toward the image pickup device side. On the other hand, as the upper limit of 1.5 is exceeded, off-axis light beams are likely to be shaded off by the positive lens groups.

The lower limit to condition (7), and (8) should be set at preferably 0.1, and more preferably 0.2.

The upper limit to condition (7), and (8) should be set at preferably 1.0, and more preferably 0.5.

Set out below are the values of conditions (7) and (8) in the example to be given later.

$D_{PP1}$=8.24
$D_{PP2}$=8.24
$f_{P1}$=18.714
$f_{P2}$=18.714
$D_{PP1}/f_{P1}$=0.440
$D_{PP2}/f_{P2}$=0.440

According to the fifth aspect of the invention, each of the $1^{st}$ to $4^{th}$ stereo imaging units is further characterized in that while an optical path entered from each entrance window is taken apart, each optical system is constructed as one having a substantially common optical axis, and a lens or a lens subgroup in at least a part of said first positive lens group and said second positive lens group is a singe lens or a lens subgroup that is located in front of said single image pickup device and has a common optical axis.

The advantages of, and the requirements for, the fifth stereo imaging unit are now explained.

With this arrangement, the whole optical system can be designed substantially in the form of a coaxial one, and aberrations can be easily corrected.

In addition, the number of components involved can be much more reduced because not only can the common image pickup device be used but also a part of the lens system can be used as a common member.

According to the sixth aspect of the invention, the $5^{th}$ stereo imaging unit is further characterized in that said plurality of reflecting surfaces are arranged such that parallax images to be projected on said single image pickup device are projected side by side in a direction of juxtaposition different from that of said first and second entrance windows.

The advantages of, and the requirements for, the $6^{th}$ stereo imaging unit are now explained.

By arranging the plurality of reflecting surfaces in that direction of juxtaposition, light beams incident on the left and right entrance windows form images on the image pickup device in a substantially vertical direction via the reflecting surfaces. Thus, if the image pickup device is located in conformity to the contour of the juxtaposed left and right parallax images, it is then possible to obtain images having wide angles of view in the left-and-right direction.

In this connection, the term "different direction" encompasses vertical directions as well as oblique directions, given that the parallax direction of the stereo imaging optical system is defined by the left-and-right or horizontal direction.

According to the seventh aspect of the invention, the $6^{th}$ stereo imaging unit is further characterized in that the optical axis of said first negative lens group the optical axis of said second negative lens group are unparallel with each other, and do not lie in the same plane.

The advantages of, and the requirements for, the $7^{th}$ stereo imaging unit are now explained.

When there is a large misalignment between the optical axes of the negative lens group and the positive lens group with an optical path taken apart, it is likely to produce decentration aberrations without recourse to correction of aberrations with both the negative and positive lens groups.

When, as in the invention, the negative lens group and the positive lens group are substantially coaxial with an optical path taken apart, optical axis misalignments are of less significance, because residual aberrations symmetrical to the optical axis of the positive lens group can be corrected at the negative lens group that is substantially coaxial thereto.

However, when the optical axis of the negative lens group is substantially in alignment with the optical axis of the positive lens group, it is impossible to carry out stereo imaging for a plurality of parallactic images by simple bending of the optical axes on the same plane, because of no overlap of left and right incident light beams on the subject side.

Therefore, if both the negative lens groups are positioned such that their optical axes are unparallel with each other and do not lie in the same plane as described above, it is then possible to separately guide the left and right parallactic images having mutual parallaxes onto the image pickup device by way of light beams from the common subject.

According to the eighth aspect of the invention, the $7^{th}$ stereo imaging unit is further characterized in that, given that the first chief ray is defined by the center ray of a light beam that reaches the center of a parallactic image projected onto said single image pickup device via said first negative lens group, said plurality of reflecting surfaces and said first positive lens group and the second chief ray is defined by the center ray of a light beam that reaches the center of a parallactic image projected onto said single image pickup device via said second negative lens group, said plurality of reflecting surfaces and said second positive lens group, an angle difference between said first chief ray incident on said first negative lens group and said second chief ray incident on said second negative lens group is smaller than an angle difference between the optical axis of said first negative lens group and the optical axis of said second negative lens group.

The advantages of, and the requirements for, the $8^{th}$ stereo imaging unit are now explained.

With such angle differences that satisfy the above requirement, there are matching points in both the left and right parallactic images, which, for instance, can be utilized for measuring the distance of the subject.

According to the ninth aspect of the invention, any one of the $6^{th}$ to $8^{th}$ stereo imaging units is further characterized in that the image pickup plane of said single image pickup device is configured in such a rectangular shape as to have a long-side direction and a short-side direction, wherein the long-side direction of said image pickup plane is inclined with respect to the parallactic direction of said stereo imaging optical system.

According to the $10^{th}$ aspect of the invention, any one of the $6^{th}$ to $8^{th}$ stereo imaging units is further characterized in that said different direction is substantially orthogonal with respect to the parallactic direction of said parallactic images.

The advantages of, and the requirements for, the $9^{th}$ and $10^{th}$ imaging units are now explained.

With an optical system wherein, as contemplated herein, entrance-side chief rays arriving at the respective parallactic images are mutually inclined while an optical path is taken apart, the image plane comes to incline with respect to the parallax direction of the stereo imaging optical system. This is because, in order to bend the optical path such that both the chief rays (as defined in connection with the $8^{th}$ stereo imaging unit) come close to each other while the parallactic images remain proximate to each other, at least one of the plurality of reflecting surfaces must have its normal inclined with respect to a plane that includes the parallactic direction of the stereo imaging optical system.

By inclining the image pickup plane of the image pickup device in such a way as to lie along this inclining image plane, it is thus possible to make effective use of the image pickup area. Especially by keeping the direction of juxtaposition of the left and right parallactic images substantially orthogonal to the parallactic direction of the parallactic images, it is possible to the make the most of the image pickup area.

According to the 11th aspect of the invention, any one of the 1st to 10th stereo imaging units is further characterized in that the image pickup plane of said single image pickup device is configured in such a rectangular shape as to have a long-side direction and a short-side direction, and said single image pickup device is located such that a parallactic image by way of said first negative lens group and a parallactic image by way of said second negative lens group are projected side by side in the short-side direction of said single image pickup device.

The advantages of, and the requirements for, the 11th stereo imaging unit are now explained.

Since the left and right parallactic images are projected side by side in the short-side direction of the rectangular image pickup device, it is possible to obtain more oblong paralactic images. It is in turn possible to achieve a stereo imaging unit well fit for an onboard type stereo imaging gadget for which information having a wide angle of view in a substantially horizontal direction is needed.

According to the 12th aspect of the invention, any one of the 1st to 11th stereo imaging units is further characterized in that the direction of scanning by said single image pickup device is inclined with respect to the parallactic direction of said stereo imaging optical system.

According to the 13th aspect of the invention, any one of the 1st to 12th stereo imaging units is further characterized in that the direction of scanning by said single image pickup device is substantially parallel with the parallactic direction of the parallactic images.

The advantages of, and the requirements for, the 12th and 13th imaging units are now explained.

With an optical system wherein, as contemplated herein, entrance-side chief rays arriving at the respective parallactic images are mutually inclined while an optical path is taken apart, the image plane comes to incline with respect to the parallax direction of the stereo imaging optical system. This is because, in order to bend the optical path such that both the chief rays (as defined in connection with the 8th stereo imaging unit) come close to each other while the parallactic images remain proximate to each other, at least one of the plurality of reflecting surfaces must have its normal inclined with respect to a plane that includes the parallactic direction of the stereo imaging optical system. By inclining the direction of scanning by the image pickup device in such a way as to lie along this titling image plane, it is thus possible to reduce image processing time.

According to the 14th aspect of the invention, any one of the 1st to 13th stereo imaging units is further characterized in that said single image pickup device is located such that the parallactic image formed via said first negative lens group and the parallactic image formed via said second negative lens group are projected side by side in a direction substantially orthogonal to the direction of scanning by said single image pickup device.

The advantages of, and the requirements for, the 14th stereo imaging unit are now explained.

With the image pickup device designed to have a vertically divided, real-time readable image-receiving plane, image information processing time can be shortened because real-time parallel processing can be implemented without recourse to any memory.

According to the 15th aspect of the invention, any one of the 1st to 14th stereo imaging units is further characterized by comprising field-limitation members for forming said at least two parallactic images on the image pickup plane of said image pickup device in a separate fashion.

The advantages of, and the requirements for, the 15th stereo imaging unit are now explained.

Preferably, field-limitation members should be located in any desired positions in the left and right optical paths in such a way as to fend off overlapping of the left and right parallactic images on the image pickup plane. When, in this case, there are no intermediate image-formation positions in the left and right optical paths, the field is limited by shading.

According to the 16th aspect of the invention, the 15th stereo imaging unit is further characterized in that at least one of said field-limitation members is said first entrance window and said second entrance window, and a field mask having a substantially rectangular opening.

The advantages of, and the requirements for, the 16th stereo imaging unit are now explained.

The field mask, if it is located at a position near to the subject for the negative lens groups, makes it easy to implement a field-stop function. The field mask, if it is configured in the shape of the image to be obtained (in a substantially rectangular shape), could have a combined field-stop function and hood function.

According to the 17th aspect of the invention, the 16th stereo imaging unit is further characterized in that said field mask is located at a position eccentric with respect to optical axes of said first negative lens group and said second negative lens group.

The advantages of, and the requirements for, the 17th stereo imaging unit are now explained.

When it is desired to form parallactic images at any desired area of the image pickup device, it is preferable to locate the field mask at a position eccentric with respect to the negative lens groups regardless of their inclinations.

According to the 18th aspect of the invention, any one of the 1st to 17th stereo imaging units is further characterized in that, given that the first chief ray is defined by the center ray of a light beam that reaches the center of a parallactic image projected onto said single image pickup device via said first negative lens group, said plurality of reflecting surfaces and said first positive lens group and the second chief ray is defined by the center ray of a light beam that reaches the center of a parallactic image projected onto said single image pickup device via said second negative lens group, said plurality of reflecting surfaces and said second positive lens group, the contour of a lens in at least either one of said first negative lens group and said second negative lens group is in a non-rotationally symmetric shape that comes closest to the optical axis of said lens on a side thereof, on which the associated chief ray is not incident.

The advantages of, and the requirements for, the 18th stereo imaging unit are now explained.

Portions in the negative lens groups other than their effective surfaces should be removed. Especially when the negative lens groups are decentered with respect to the chief rays, some portions of the negative lens groups on their sides on which the chief rays are not incident are unnecessary. With the arrangement of the 18$^{th}$ aspect of the invention, size reductions can be achieved. This arrangement also permits the negative lens groups to function as a part of the field-limitation members.

According to the 19$^{th}$ aspect of the invention, there is provided a stereo imaging system, characterized by comprising a stereo imaging unit as recited in any one of the 1$^{st}$ to 18$^{th}$ stereo imaging units, an image processor that is operable in response to an image from said stereo imaging unit to calculate a subject distance, producing a distance signal and a controller that is operable in response to said distance signal to control other device.

According to the 20$^{th}$ aspect of the invention, the 19$^{th}$ stereo imaging unit is further characterized in that said other device is a display device.

According to the 21$^{st}$ aspect of the invention, the 19$^{th}$ stereo imaging unit is further characterized in that said other device is an alarm device.

According to the 22$^{nd}$ aspect of the invention, the 19$^{th}$ stereo imaging unit is further characterized in that said other device is an operating device.

According to the 23$^{rd}$ aspect of the invention, there is provided a stereo imaging unit comprising a single image pickup device and a stereo imaging optical system for forming at least two parallactic images having mutual parallaxes on said single image pickup device, characterized in that said stereo imaging optical system comprises:

a first objective lens group having negative refracting power, and a second objective lens group having negative refracting power and located with a spacing provided therebetween, an image-formation lens group having positive refracting power and located in an optical path on an image pickup device side with respect to said first objective lens group and said second objective lens group, a 1-1$^{st}$ reflecting surface for reflecting an incident light beam on said first objective lens group toward said first objective lens group and a 1-2$^{nd}$ reflecting surface for reflecting a light beam from said 1-1$^{st}$ reflecting surface toward said image pickup device, and a 2-1$^{st}$ reflecting surface for an incident light beam on said second objective lens group toward said first objective lens group and a 2-2$^{nd}$ reflecting surface for reflecting a light beam from said 2-1$^{st}$ reflecting surface toward said image pickup device, wherein:

said 1-2$^{nd}$ reflecting surface and said 2-2$^{nd}$ reflecting surfaces are located in such a way as to reflect light beams reflected thereat toward a subject, and said single image pickup device is located on a side of the light beams reflected at said 1-2$^{nd}$ reflecting surface and said 2-2$^{nd}$ reflecting surface.

The advantages of, and the requirements for, the 23$^{rd}$ stereo imaging unit are now explained.

Referring first to the term "parallactic direction" used herein before giving an explanation of the invention, that term means a direction of connecting the position of a center ray incident from the same subject on the entrance surface of the first objective lens group with the position of a center ray incident on the entrance surface of the second objective lens group. Usually, a horizontal (left-and-right) direction is chosen in the invention; however, that parallactic direction is not always limited thereto, and so could be selected from any desired vertical or oblique directions. For a parallactic image on the image pickup device (an image-formation plane), a relative misalignment direction of the same subject on a plurality of parallactic images is defined as that parallactic direction.

The term "single image pickup device" used herein means one that has not only one single receiving plane but also a plurality of juxtaposed receiving planes on the same substrate (of usually a semiconductor material).

Referring now to the stereo imaging optical system in the stereo imaging unit of the invention, light beams incident on the juxtaposed (that, unless otherwise stated, will stand for the parallactic direction) left and right negative objective lens groups (the first and second objective lens groups) are reflected at the aforesaid respective reflecting surfaces (the 1-1$^{st}$ and 1-2$^{nd}$ reflecting surfaces for the first objective lens group, and the 2-1$^{st}$ and 2-2$^{nd}$ reflecting surfaces for the second objective lens group) on the way to the image pickup device, and images having parallaxes (parallactic images) are guided onto the image pickup device by way of the image-formation lens group.

Thus, the image pickup device can be used as a common member, so that the number of components involved can be reduced, leading to reductions in the size and weight of the stereo imaging unit.

When two such image pickup devices are provided for left and right parallactic images, respectively, it is intractable to make correction for variations in the performance of the left and right image pickup devices and read image information from the left and right image pickup devices in synchronism. However, these problems can be solved by use of the common single image pickup device.

By imparting negative refracting power to the objective lens groups and positive refracting power to the image-formation lens group on the image plane side, a wide angle-of-view arrangement is achievable because the left and right optical systems can each be designed as a retro-focus type.

In this regard, it is noted that when the size of the stereo imaging optical system is further reduced by making its horizontal size small, any suitable parallax is not obtainable, encountering difficulty in obtaining effective stereo images. In the invention, the optical path is bent as described above so as to reduce increases in the size of the stereo imaging unit in its depth and height directions. To this end, the image pickup device is interposed between the left and right image objective lens groups.

This enables the optical system to be much smaller than a conventional arrangement wherein an optical path is bent in such a direction as to increase in its depth and height direction size, because the image pickup device is located in a dead space between the left and right objective lens groups.

According to the 24$^{th}$ aspect of the invention, the 23$^{rd}$ stereo imaging unit is further characterized in that said image-formation lens group is located just in front of said single image pickup device.

The advantages of, and the requirements for, the 24$^{th}$ stereo imaging unit are now explained.

By locating the image-formation optical system just before the image pickup device as defined above, it is unnecessary to make the diameter of the image-formation optical system larger than that of an image-formation optical system interposed only between two reflecting surfaces, making easier it to afford telecentricity to the image pickup device.

According to the 25$^{th}$ aspect of the invention, the 24$^{th}$ stereo imaging unit is further characterized in that said image-formation lens group receives light beams for forming said at least two parallactic images, and has only one optical axis.

The advantages of, and the requirements for, the 25$^{th}$ stereo imaging unit are now explained.

In addition, the number of components involved can be much more reduced because not only can the common image pickup device be used but also the lens groups in the rear of the reflecting surfaces can be used as a common member.

According to the 26$^{th}$ aspect of the invention, any one of the 23$^{rd}$ to 25$^{th}$ stereo imaging units is further characterized in that said 1-1$^{st}$ reflecting surface, said 1-2$^{nd}$ reflecting surface, said 2-1$^{st}$ reflecting surface and said 2-2$^{nd}$ reflecting surface are arranged such that parallax images to be projected onto said single image pickup device are projected in a direction of juxtaposition different from that of said first objective lens group and said second objective lens group.

The advantages of, and the requirements for, the 26$^{th}$ stereo imaging unit are now explained.

By arranging the respective reflecting surfaces in that direction of juxtaposition, light beams incident on the left and right objective lens groups form images on the image pickup device in a substantially vertical direction via the respective reflecting surfaces. Thus, if the image pickup device is located in alignment to such image-formation positions, it is then possible to obtain images at wide angles of view in the left-and-right direction.

According to the 27$^{th}$ aspect of the invention, the 26$^{th}$ stereo imaging unit is further characterized in that, given that the first virtual optical axis is defined by the optical axis of said image-formation lens group as passing through said 1-2$^{nd}$ reflecting surface, said 1-1$^{st}$ reflecting surface and said first objective lens group upon back ray tracing and the second virtual optical axis is defined by the optical axis of said image-formation lens group as passing through said 2-2$^{nd}$ reflecting surface, said 2-1$^{st}$ reflecting surface and said second objective lens group upon back ray tracing, the first virtual optical axis entering said first objective lens group and the second virtual optical axis entering said second objective lens group are unparallel with each other, and do not lie in the same plane.

The advantages of, and the requirements for, the 27$^{th}$ stereo imaging unit are now explained.

When the image-formation lens group acting as a common optical system to the left and right objective lens groups is constructed such that its optical axis passes through a plurality of left and right reflecting surface and objective lens groups upon back ray tracing, the left and right parallactic images are projected onto the image pickup device in a partly overlapping manner. To avoid this, it is necessary to shade off light rays at the 1-2$^{nd}$ and 2-2$^{nd}$ reflecting surfaces that are optical members nearest to the image-formation lens group side. To prevent such shading, it is here assumed that the virtual optical axes are defined by optical axes that pass through the 1-2$^{nd}$ and 2-2$^{nd}$ reflecting surfaces upon enlargement and the objective lens groups.

By locating the virtual optical axes unparallel with each other and permitting them not to lie in the same plane, it is thus possible to guide light beams from a common subject onto the common image pickup device by way of the image-formation lens group while they do not overlap and, hence, to prevent any misalignment of the parallactic images in terms of field. It is also possible to take a wide range of distance from the common subject to the stereo imaging unit.

According to the 28$^{th}$ aspect of the invention, the 26$^{th}$ stereo imaging unit is further characterized in that said first objective lens group and said second objective lens group are each comprised of a lens group with a rotationally symmetric optical axis, and with an optical path taken apart, each optical axis is substantially in alignment with the optical axis of said image-formation lens group, and the optical axis of said first objective lens group and the optical axis of said second objective lens group are unparallel with each other and do not lie in the same plane.

The advantages of, and the requirements for, the 28$^{th}$ stereo imaging unit are now explained.

When there is a large misalignment between the optical axes of the objective lens groups and the image-formation lens group with an optical path taken apart, it is likely to produce decentration aberrations without recourse to correction of aberrations with both the negative and positive lens groups.

When, as in the invention, the objective lens groups and the image-formation lens group are substantially coaxial with an optical path taken apart, optical axis misalignments are of less significance, because residual aberrations symmetrical to the optical axis of the image-formation lens group can be corrected at the objective lens groups that are substantially coaxial thereto.

However, when the optical axes of the objective lens groups are substantially in alignment with the optical axis of the image-formation lens group, it is impossible to carry out stereo imaging for a plurality of parallactic images having mutual parallaxes by simple bending of the optical axes on the same plane, because of no overlap of left and right incident light beams on the subject side.

Therefore, if both the objective lens groups are positioned such that their optical axes are unparallel with each other and do not lie in the same plane as described above, it is then possible to separately guide the left and right parallactic images having mutual parallaxes onto the image pickup device by way of light beams from the common subject.

According to the 29$^{th}$ aspect of the invention, the 27$^{th}$ stereo imaging unit is further characterized in that, given that the first chief ray is defined by the center ray of a light beam that reaches the center of a parallactic image projected onto said single image pickup device via said first objective lens group, said 1-1$^{st}$ reflecting surface, said 1-2$^{nd}$ reflecting surface and said image-formation lens group and the second chief ray is defined by the center ray of a light beam that reaches the center of a parallactic image projected onto said single image pickup device via said second objective lens group, said 2-1$^{st}$ reflecting surface, said 2-2$^{nd}$ reflecting surface and said image-formation lens group, an angle difference between said first chief ray incident on said first objective lens group and said second chief ray incident on said second objective lens group is smaller than an angle difference between said first virtual optical axis entering said first objective lens group and said second virtual optical axis entering said second objective lens group.

According to the 30$^{th}$ aspect of the invention, the 28$^{th}$ stereo imaging unit is further characterized in that, given that the first chief ray is defined by the center ray of a light beam that reaches the center of a parallactic image projected onto said single image pickup device via said first objective lens group, said 1-1$^{st}$ reflecting surface, said 1-2$^{nd}$ reflecting surface and said image-formation lens group and the second chief ray is defined by the center ray of a light beam that reaches the center of a parallactic image projected onto said single image pickup device via said second objective lens group, said 2-1$^{st}$ reflecting surface, said 2-2$^{nd}$ reflecting surface and said image-formation lens group, an angle difference between said first chief ray incident on said first objective lens group and said second chief ray incident on said second objective lens group is smaller than an angle difference between the optical axis of said first objective lens group and the optical axis of said second objective lens group.

The advantages of, and the requirements for, the 29th$^{th}$ and 30$^{th}$ stereo imaging units are now explained.

With such angle differences that satisfy the above requirements, there are matching points in both the left and right parallactic images, which, for instance, can be utilized for measuring the distance of the subject.

According to the 31$^{st}$ aspect of the invention, any one of the 26$^{th}$ to 30$^{th}$ stereo imaging units is further characterized in that the image pickup plane of said single image pickup device is configured in such a rectangular shape as to have a long-side direction and a short-side direction, wherein the long-side direction of said image pickup plane is inclined with respect to the parallactic direction of said stereo imaging optical system.

According to the 32$^{nd}$ aspect of the invention, any one of the 26$^{th}$ to 31$^{st}$ stereo imaging units is further characterized in that said different direction is substantially orthogonal with respect to the parallactic direction of said parallactic images.

The advantages of, and the requirements for, the 31$^{st}$ and 32$^{nd}$ imaging units are now explained.

With an optical system wherein, as contemplated herein, entrance-side chief rays arriving at the respective parallactic images are mutually inclined while an optical path is taken apart, the image plane comes to incline with respect to the parallax direction of the stereo imaging optical system. This is because, in order to bend the optical path such that both the chief rays come close to each other while the parallactic images remain proximate to each other, at least one of the first reflecting surface (the 1-1$^{st}$ and 2-1$^{st}$ reflecting surfaces) and the second reflecting surface (the 1-2$^{nd}$ and 2-2$^{nd}$ reflecting surfaces) must have its normal inclined with respect to a plane that includes the parallactic direction of the stereo imaging optical system.

By inclining the image pickup plane of the image pickup device in such a way as to lie along this inclining image plane, it is thus possible to make effective use of the image pickup area. Especially by keeping the direction of juxtaposition of the left and right parallactic images substantially orthogonal to the parallactic direction of the parallactic images, it is possible to the make the most of the image pickup area.

According to the 33$^{rd}$ aspect of the invention, any one of the 23$^{rd}$ to 32$^{nd}$ stereo imaging units is further characterized in that the image pickup plane of said single image pickup device is configured in such a rectangular shape as to have a long-side direction and a short-side direction, and said single image pickup device is located such that a parallactic image by way of said first objective lens group and a parallactic image by way of said second objective lens group are projected side by side in a short-side direction of said single image pickup device.

The advantages of, and the requirements for, the 33$^{rd}$ stereo imaging unit are now explained.

Since the left and right parallactic images are projected in alignment with the short-side direction of the rectangular image pickup device, it is possible to obtain a more oblong paralactic image. It is in turn possible to achieve a stereo imaging unit well fit for an onboard type stereo imaging gadget for which information having a wide angle of view in a substantially horizontal direction is needed.

According to the 34$^{th}$ aspect of the invention, any one of the 23$^{rd}$ to 33$^{rd}$ stereo imaging units is further characterized in that the direction of scanning by said single image pickup device is inclined with respect to the parallactic direction of said stereo imaging optical system.

According to the 35$^{th}$ aspect of the invention, any one of the 23$^{rd}$ to 34$^{th}$ stereo imaging units is further characterized in that the direction of scanning by said single image pickup device is substantially parallel with the parallactic direction of the parallactic images.

The advantages of, and the requirements for, the 34$^{th}$ and 35$^{th}$ imaging units are now explained.

With an optical system wherein, as contemplated herein, entrance-side chief rays arriving at the respective parallactic images are mutually inclined while an optical path is taken apart, the image plane comes to incline with respect to the parallax direction of the stereo imaging optical system. This is because, in order to bend the optical path such that both the chief rays come close to each other while the parallactic images remain proximate to each other, at least one of the first reflecting surface (the 1-1$^{st}$ and 2-1$^{st}$ reflecting surfaces) and the second reflecting surface (the 1-2$^{nd}$ and 2-2$^{nd}$ must have its normal inclined with respect to a plane that includes the parallactic direction of the stereo imaging optical system. By inclining the direction of scanning by the image pickup device in such a way as to lie along this inclining image plane, it is thus possible to reduce image processing time.

According to the 36$^{th}$ aspect of the invention, any one of the 23$^{rd}$ to 35$^{th}$ stereo imaging units is further characterized in that said single image pickup device is located such that the parallactic image formed via said first objective lens group and the parallactic image formed via said second objective lens group are projected side by side in a direction substantially orthogonal to the direction of scanning by said single image pickup device.

The advantage of, and the requirements for, the 36$^{th}$ stereo imaging unit is now explained.

With the image pickup device designed to have a vertically divided, real-time readable image-receiving plane, image information processing time can be shortened because real-time parallel processing can be implemented without recourse to any memory.

According to the 37$^{th}$ aspect of the invention, any one of the 23$^{rd}$ to 36$^{th}$ stereo imaging units is further characterized by satisfying conditions (11), (12), (13) and (14):

$$-10.0 < f_{T1}/f_1 < -2.0 \tag{11}$$

$$-10.0 < f_{T2}/f_2 < -2.0 \tag{12}$$

$$1.5 < f_K/f_1 < 10 \tag{13}$$

$$1.5 < f_K/f_2 < 10 \tag{14}$$

where $f_{T1}$ is the focal length of said first objective lens group, $f_{T2}$ is the focal length of said second objective lens group, $f_K$ is the focal length of said image-formation lens group, $f_1$ is the focal length of the stereo imaging optical system including said first objective lens group, and $f_2$ is the focal length of the stereo imaging optical system including said second objective lens group.

The advantages of, and the requirements for, the 37$^{th}$ stereo imaging units are now explained.

Conditions (11), (12), (13) and (14) are provided to define the focal length of each objective lens group and the focal length of the image-formation lens group in terms of the focal length of the stereo imaging optical system so as to obtain images having a suitable angle of view and a suitable parallax throughout the stereo imaging optical system. As the lower limits of −10.0 to conditions (11) and (12) are not reached or the refracting power of each objective lens group becomes weak, any desired wide angle of view cannot be obtained with an increase in the diameter of the objective lens groups.

On the other hand, as the upper limit of −2.0 to conditions (11) and (12) os exceeded, the spacing between both the lens groups becomes narrow, rendering it difficult to bend an optical path with a plurality of mirrors interposed between them.

Again, as the lower limit of 1.5 to conditions (13) and (14) is not reached or the refracting power of the image-formation lens group becomes weak, the spacing between both the lens groups becomes narrow, and as the upper limit of 10 thereto is exceeded or the refracting power of the image-formation lens group becomes small, the spacing between both the lens groups becomes too wide, resulting in a bulky unit.

The lower limit to condition (11), and (12) should be set at preferably −8.0, and more preferably −6.0.

The upper limit to condition (11), and (12) should be set at preferably −3.0, and more preferably −4.0.

The lower limit to condition (13), and (14) should be set at preferably 2.5, and more preferably 3.0.

The upper limit to condition (13), and (14) should be set at preferably 7.0, and more preferably 5.0.

According to the 38$^{th}$ aspect of the invention, any one of the 23$^{rd}$ to 37$^{th}$ stereo imaging units is further characterized by satisfaction of condition (15):

$$-0.4<\beta_K<-0.06 \tag{15}$$

where $\beta_K$ is the transverse magnification of said image-formation lens group.

The advantages of, and the requirements for, the 38$^{th}$ stereo imaging unit are now explained.

Condition (15) is provided to define the transverse magnifications of the image-formation lens groups. As the lower limit of −0.4 to condition (15) is not reached, there is an increased back focus, leading to a bulky optical system. On the other hand, as the upper limit of −0.06 to condition (15) is exceeded, any wide angle-of-view arrangement is unachievable and the diameter of the negative lens group becomes too large, because the refracting power of the objective lens groups becomes weak. In addition, the diameter of the objective lens groups becomes too large.

The lower limit to condition (15) should be set at preferably −0.3, and more preferably −0.25.

The upper limit to condition (15) should be set at preferably −0.1, and more preferably −0.15.

Enumerated below are the values of conditions (11) to (15) in the stereo imaging optical systems in the examples to be given later.

$f_{T1}=-22.908$
$f_{T2}=-22.908$
$f_K=18.714$
$f_1=5.00$
$f_2=5.00$
$f_{T1}/f_1=-4.57$
$f_{T2}/f_2=-4.57$
$f_K/f_1=3.74$
$f_K/f_2=3.74$
$\beta_K=-0.218$ According to the 39$^{th}$ aspect of the invention, any one of the 23$^{rd}$ to 38$^{th}$ stereo imaging units is further characterized by comprising a stop member interposed between said first and second objective lens groups and said image-formation lens group for forming an exit pupil.

The advantages of, and the requirements for, the 39$^{th}$ stereo imaging unit are now explained.

With this arrangement, it is easy to make an incident light beam on the image pickup device telecentric. It is also possible to keep the objective lens groups and the image-formation lens group against increasing in diameter.

According to the 40$^{th}$ aspect of the invention, the 39$^{th}$ stereo imaging unit is further characterized by satisfying condition (16) while an optical path is taken apart:

$$0.03<D_{PK}/f_K<1.5 \tag{16}$$

where $D_{PK}$ is the distance from said stop member to the entrance surface of said image-formation lens group, and $f_K$ is the focal length of said image-formation lens group.

The advantages of, and the requirements for, the 40$^{th}$ stereo imaging unit are now explained.

As the lower limit of 0.03 to condition (16) is not reached, the effect of making the arrangement telecentric toward the image pickup device side becomes small. As the upper limit of 1.5 is exceeded, on the other hand, an off-axis light beam is susceptible of shading by the image-formation lens group.

The lower limit to condition (16) should be set at preferably 0.1, and more preferably 0.2.

Regarding condition (16), the stereo imaging optical system in the example to be given later has the following values.

$D_{PX}=8.24$
$f_K=18.714$
$D_{PK}/f_K=0.440$

According to the 41$^{st}$ aspect of the invention, any one of the 23$^{rd}$ to 40$^{th}$ stereo imaging units is further characterized by comprising field-limitation members for forming said at least two parallactic images on the image pickup plane of said image pickup device in a separate fashion.

The advantages of, and the requirements for, the 41$^{st}$ stereo imaging unit are now explained.

Preferably, the field-limitation members should be located in any desired positions in the left and right optical paths in such a way as to fend off overlapping of the left and right parallactic images on the image pickup plane. When, in this case, there are no intermediate image-formation positions in the left and right optical paths, the field is limited by shading.

According to the 42$^{nd}$ aspect of the invention, the 41$^{st}$ stereo imaging unit is further characterized in that at least one of said field-limitation members is a field mask that is located on the subject side of said objective lens groups and has a substantially rectangular opening.

The advantages of, and the requirements for, the 42$^{nd}$ stereo imaging unit are now explained.

The field mask, if it is located at a position of the objective lens groups near to the subject, makes it easy to implement a field-stop function. The field mask, if it is configured in the shape of the image to be obtained (in a substantially rectangular shape), could have a combined field-stop function and hood function.

According to the 43$^{rd}$ aspect of the invention, the 42$^{nd}$ stereo imaging unit is further characterized in that said field mask is located at a position eccentric with respect to the optical axes of said objective lens groups.

The advantages of, and the requirements for, the 43$^{rd}$ stereo imaging unit are now explained.

When it is desired to form parallactic images at any desired area of the image pickup device, it is preferable to locate the field mask at a position eccentric with respect to the objective lens groups regardless of their inclinations.

According to the 44$^{th}$ aspect of the invention, any one of the 23$^{rd}$ to 43$^{rd}$ stereo imaging units is further characterized in that, given that the first chief ray is defined by the center ray of a light beam that reaches the center of a parallactic image projected onto said single image pickup device via said first objective lens group, said 1-1$^{st}$ reflecting surface, said 1-2$^{nd}$ reflecting surface and said image-formation lens group and the second chief ray is defined by the center ray of a light beam that reaches the center of a parallactic image projected onto said single image pickup device via said second objective lens group, said 2-1$^{st}$ reflecting surface, said 2-2$^{nd}$ reflecting surface and said image-formation lens group, the contour of a lens in at least either one of said first objective lens group and said second objective lens group is in a non-rotationally symmetric shape that comes closest to the optical axis of said lens on a side thereof, on which the associated chief ray is not incident.

The advantages of, and the requirements for, the 44$^{th}$ stereo imaging unit are now explained.

Portions in the objective lens groups other than their effective surfaces should preferably be removed. Especially when the objective lens groups are decentered with respect to the chief rays, some portions of the objective lens groups on their sides on which the chief rays are not incident are unnecessary. With the arrangement of the 44$^{th}$ aspect of the invention, size reductions can be achieved. This arrangement also permits the objective lens groups to function as a part of the field-limitation members.

According to the 45$^{th}$ aspect of the invention, there is provided a stereo imaging system comprising a stereo imaging unit as recited in any one of the 23$^{rd}$ to 44$^{th}$ aspects of the invention, an image processor that is operable in response to an image from said stereo imaging unit to calculate a subject distance, producing a distance signal and a controller that is operable in response to said distance signal to control other device.

According to the 46$^{th}$ aspect of the invention, the 45$^{th}$ stereo imaging unit is further characterized in that said other device is a display device.

According to the 47$^{th}$ aspect of the invention, the 45$^{th}$ stereo imaging unit is further characterized in that said other device is an alarm device.

According to the 48$^{th}$ aspect of the invention, the 45$^{th}$ stereo imaging unit is further characterized in that said other device is an operating device.

According to the 49$^{th}$ aspect of the invention, there is provided a stereo imaging unit comprising a single image pickup device and a stereo imaging optical system for forming at least two parallactic images having mutual parallaxes on said single image pickup device, characterized in that said stereo imaging optical system comprises:

an image-formation lens group of positive refracting power, which is located in front of said single image pickup device, receives light beams for forming said at least two parallactic images, and has only one optical axis, a first objective lens group and a second objective lens, each of which has negative reflecting power and which have entrance surfaces facing a subject side and are juxtaposed with a spacing therebetween in a parallactic direction, a first light-guide optical system that includes a 1-1$^{st}$ reflecting surface and a 1-2$^{nd}$ reflecting surface for guiding a light beam incident from a subject thereon via said first objective lens group to said image-formation lens group, and a second light-guide optical system that includes a 2-1$^{st}$ reflecting surface and a 2-2$^{nd}$ reflecting surface for guiding a light beam incident from the subject thereon via said second objective lens group to said image-formation lens group.

The advantages of, and the requirements for, the 49$^{th}$ stereo imaging unit are now explained.

Referring first to the term "parallactic direction" used herein before giving an explanation of the invention, that term means a direction of connecting the position of a center ray incident from the same subject on the entrance surface of the first objective lens group with the position of a center ray incident on the entrance surface of the second objective lens group. Usually, a horizontal (left-and-right) direction is chosen in the invention; however, that parallactic direction is not always limited thereto, and so could be selected from any desired vertical or oblique directions. For a parallactic image on the image pickup device (an image-formation plane), a relative misalignment direction of the same subject on a plurality of parallactic images is defined as that parallactic direction.

The term "single image pickup device" used herein means one that has not only one single receiving plane but also a plurality of juxtaposed receiving planes on the same substrate (of usually a semiconductor material).

Referring now to the stereo imaging optical system in the stereo imaging unit of the invention, light beams incident on the juxtaposed (that, unless otherwise stated, will stand for the parallactic direction) left and right negative objective lens groups (the first and second objective lens groups) are reflected at the aforesaid respective reflecting surfaces (the 1-1$^{st}$ and 1-2nd reflecting surfaces for the first objective lens group, and the 2-1$^{st}$ and 2-2$^{nd}$ reflecting surfaces for the second objective lens group) into the common image-formation lens group, and images having parallaxes (parallactic images) are guided onto the image pickup device.

Thus, the image pickup device and a part of the lens systems can be used as a common member, so that the number of parts involved can be reduced, leading to reductions in the size and weight of the stereo imaging unit.

When two such image pickup devices are provided for left and right parallactic images, respectively, it is intractable to make correction for variations in the performance of the left and right image pickup devices and read image information from the left and right image pickup devices in synchronism. However, these problems can be solved by use of the common single image pickup device.

By imparting negative refracting power to the objective lens groups and positive refracting power to the image-formation lens group on the image plane side, a wide angle-of-view arrangement is achievable because the left and right optical systems can each be designed as a retrofocus type.

It is noted that the number of parallactic images is not always limited to two, and so three or more parallactic images could be guided onto the single image pickup device. In this case, sets of objective lens groups and light-guide optical systems corresponding to that number are required.

According to the 50$^{th}$ aspect of the invention, the 49$^{th}$ stereo imaging unit is further characterized in that said stereo imaging optical system is constructed such that said at least two parallactic images having parallaxes, to be projected onto said single image pickup device, are projected side by side in a direction different from the parallactic direction thereof.

The advantages of, and the requirements for, the $50^{th}$ stereo imaging unit are now explained.

With the thus constructed stereo imaging unit, light beams incident on the left and right objective lens groups form images generally vertically on the image pickup device by way of the associated reflecting surfaces. By locating the image pickup device in conformity with the contours of the juxtaposed left and right parallactic image, it is thus possible to obtain images having wide angles of view in the left-and-right direction.

In this connection, the term "direction different from the parallactic direction" encompasses vertical directions as well as oblique directions, given that the parallax direction of the stereo imaging optical system is defined by the left-and-right.

According to the $51^{st}$ aspect of the invention, the $50^{th}$ stereo imaging unit is further characterized in that bending of an optical path from said image-formation lens group by said first light-guide optical system and said second light-guide optical system upon back ray tracing is effected by reflections at only four reflecting surfaces; said $1\text{-}1^{st}$ reflecting surface, said $1\text{-}2^{nd}$ reflecting surface, said $2\text{-}1^{st}$ reflecting surface and said $2\text{-}2^{nd}$ reflecting surface.

The advantages of, and the requirements for, the $51^{st}$ stereo imaging unit are now explained.

For the bending of the optical path by the image-formation lens group upon back ray tracing (an optical path upon back ray tracing from the image pickup device side to the objective lens group side), no reliance is on bending by a refracting prism in the light-guide optical systems (the first and second light-guide optical systems). It is thus possible to prevent occurrence of chromatic aberrations by the bending of the optical path.

According to the $52^{nd}$ aspect of the invention, any one of the $49^{th}$, $50^{th}$ and $51^{st}$ stereo imaging units is further characterized in that, given that the first chief ray is defined by the center ray of a light beam that reaches the center of a parallactic image projected onto said single image pickup device via said first objective lens group, said first light-guide optical system and said image-formation lens group and the second chief ray is defined by the center ray of a light beam that reaches the center of a parallactic image projected onto said single image pickup device via said second objective lens group, said second light-guide optical system and said image-formation lens group, said first objective lens group is operable as an optical system for polarizing said first chief ray, and said second objective lens group is operable as an optical system for polarizing said second chief ray.

The advantages of, and the requirements for, the $52^{nd}$ stereo imaging unit are now explained.

With the stereo imaging optical system in the $49^{th}$ stereo imaging unit, it is difficult to bend each chief ray (the first chief ray, the second chief ray) within the same paper plane, because the common image-formation lens group is used. For this reason, it is preferable that each objective lens group has an additional function of bending (polarizing) the corresponding chief ray.

It is acceptable that each objective lens group has a common optical axis or the lenses in each lens group are free from any common axis of symmetry.

According to the $53^{rd}$ aspect of the invention, the $52^{nd}$ stereo imaging unit is further characterized in that, given that the first virtual optical axis is defined by the optical axis of said image-formation lens group as passing through said first light-guide optical system and said first objective lens group upon back ray tracing and the second virtual optical axis is defined by the optical axis of said image-formation lens group as passing through said second light-guide optical system and said second objective lens group upon back ray tracing, the first virtual optical axis entering said first objective lens group and the second virtual optical axis entering said second objective lens group are unparallel with each other, and do not lie in the same plane.

The advantages of, and the requirements for, the $53^{rd}$ stereo imaging unit are now explained.

When the image-formation lens group acting as a common optical system to the left and right is constructed such that its optical axis passes through the left and right light-guide optical systems and objective lens groups upon back ray tracing, the left and right parallactic images are projected onto the image pickup device in a partly overlapping manner. To avoid this, it is necessary to shade off light rays at, for instance, the $1\text{-}2^{nd}$ and $2\text{-}2^{nd}$ reflecting surfaces in the respective light-guide optical systems, which are optical members nearest to the image-formation lens group side. To prevent such shading, it is here assumed that the virtual optical axes are defined by optical axes that pass through the optical members in the respective light-guide optical systems, which are located nearest to the image-formation lens group, upon enlargement, and the objective lens groups.

By locating the virtual optical axes unparallel with each other and permitting them not to lie in the same plane, it is thus possible to guide light beams from a common subject onto the common image pickup device by way of the image-formation lens group while they do not overlap and, hence, to prevent any misalignment of the parallactic images in terms of field.

According to the $54^{th}$ aspect of the invention, the $52^{nd}$ stereo imaging unit is further characterized in that said first chief ray incident on said first objective lens group and said second chief ray incident on said second objective lens group lie in substantially the same plane.

The advantages of, and the requirements for, the $54^{th}$ stereo imaging unit are now explained.

By permitting the chief rays incident on the respective objective lens groups to lie in much the same plane, it is thus possible to guide light beams from a common subject onto the common image pickup device by way of the common image-formation lens group while they do not overlap and, hence, to prevent any misalignment of the parallactic images in terms of field. It is also possible to take a wide range of distance from the common subject to the stereo imaging unit.

According to the $55^{th}$ aspect of the invention, any one of the $49^{th}$ to $54^{th}$ stereo imaging units is further characterized in that said first objective lens group and said second objective lens group are each comprised of a lens group with a rotationally symmetric optical axis; the optical axis of said first objective lens group and the optical axis of said second objective lens group are unparallel with each other and lie at positions of rotational symmetry about the optical axis of said image-formation optical lens; and with an optical path taken apart, the optical axis of each objective lens group is substantially in alignment with the optical axis of said image-formation lens group.

The advantages of, and the requirements for, the $55^{th}$ stereo imaging unit are now explained.

When there is a large misalignment between the optical axes of the objective lens groups and the image-formation lens group with an optical path taken apart, it is likely to produce decentration aberrations without recourse to correction of aberrations with both the objective lens groups and the image-formation lens group.

When, as in the invention, the objective lens groups and the image-formation lens group are substantially coaxial with an optical path taken apart, on the other hand, optical axis misalignments are of less significance, because residual aberrations symmetrical to the optical axis of the image-formation lens group can be corrected at the objective lens groups that are substantially coaxial thereto.

However, when the optical axes of the objective lens groups are substantially in alignment with the optical axis of the image-formation lens group, it is impossible to carry out stereo imaging for a plurality of parallactic images having parallaxes by simple bending of the optical axes on the same plane, because of no overlap of left and right incident light beams on the subject side.

Therefore, if both the objective lens groups are positioned such that their optical axes are unparallel with each other and lie at the positions of rotational symmetry as described above, it is then possible to separately guide the left and right parallactic images having mutual parallaxes having mutual parallaxes onto the image pickup device by way of light beams from the common subject.

According to the $56^{th}$ aspect of the invention, the $53^{rd}$ or $54^{th}$ stereo imaging unit is further characterized in that an angle difference between said first chief ray incident on said first objective lens group and said second chief ray incident on said second objective lens group is smaller than an angle difference between said first virtual optical axis entering said first objective lens group and said second virtual optical axis entering said second objective lens group.

According to the $57^{th}$ aspect of the invention, the $55^{th}$ stereo imaging unit is further characterized in that an angle difference between the said first chief ray incident on said first objective lens group and said second chief ray incident on said second objective lens group is smaller than an angle difference between the optical axis of said first objective lens group and the optical axis of said second objective lens group.

The advantages of, and the requirements for, the $56th^{th}$ and $57^{th}$ stereo imaging units are now explained.

With such angle differences that satisfy the above requirements, there are matching points in both the left and right parallactic images, which, for instance, can be utilized for measuring the distance of the subject.

According to the $58^{th}$ aspect of the invention, any one of the $50^{th}$ to $57^{th}$ stereo imaging units is further characterized in that the image pickup plane of said single image pickup device is configured in such a rectangular shape as to have a long-side direction and a short-side direction, wherein the long-side direction of said image pickup plane is inclined with respect to the parallactic direction of said stereo imaging optical system.

According to the $59^{th}$ aspect of the invention, any one of the $50^{th}$ to $58^{th}$ stereo imaging units is further characterized in that said direction different from the direction of juxta-position of parallactic images on said single image pickup device is substantially orthogonal to the parallactic direction of said parallactic images.

The advantages of, and the requirements for, the $58^{th}$ and $59^{th}$ imaging units are now explained.

With an optical system wherein, as contemplated herein, entrance-side chief rays arriving at the respective parallactic images are mutually inclined while an optical path is taken apart, the image plane comes to incline with respect to the parallax direction of the stereo imaging optical system. This is because, in order to bend the optical path such that both the chief rays come parallel to each other while the parallactic images remain proximate to each other, at least one of the first reflecting surface (the 1-$1^{st}$ and 2-$1^{st}$ reflecting surfaces) and the second reflecting surface (the 1-$2^{nd}$ and 2-$2^{nd}$ reflecting surfaces) in the light-guide optical systems must have its normal inclined with respect to a plane that includes the parallactic direction of the stereo imaging optical system.

By inclining the image pickup plane of the image pickup device in such a way as to lie along this inclining image plane, it is thus possible to make effective use of the image pickup area. Especially by keeping the direction of juxta-position of the left and right parallactic images substantially orthogonal to the parallactic direction of the parallactic images, it is possible to the make the most of the image pickup area.

According to the $60^{th}$ aspect of the invention, any one of the $49^{th}$ to $59^{th}$ stereo imaging units is further characterized in that the image pickup plane of said single image pickup device is configured in such a rectangular shape as to have a long-side direction and a short-side direction, and said single image pickup device is located such that a parallactic image by way of said first objective lens group and a parallactic image by way of said second objective lens group are projected side by side in the short-side direction of said single image pickup device.

The advantages of, and the requirements for, the $60^{th}$ stereo imaging unit are now explained.

Since the left and right parallactic images are projected in alignment with the short-side direction of the rectangular image pickup device, it is possible to obtain a more oblong paralactic image. It is in turn possible to achieve a stereo imaging unit well fit for an onboard type stereo imaging gadget for which information having a wide angle of view in a substantially horizontal direction is needed.

According to the $61^{st}$ aspect of the invention, any one of the $50^{th}$ to $60^{th}$ stereo imaging units is further characterized in that the direction of scanning by said single image pickup device is inclined with respect to the parallactic direction of said stereo imaging optical system.

According to the $62^{nd}$ aspect of the invention, any one of the $50^{th}$ to $60^{th}$ stereo imaging units is further characterized in that the direction of scanning by said single image pickup device is substantially parallel with the parallactic direction of the parallactic images.

The advantages of, and the requirements for, the $61^{st}$ and $62^{nd}$ imaging units are now explained.

With an optical system wherein, as contemplated herein, entrance-side chief rays arriving at the respective parallactic images are mutually inclined while an optical path is taken apart, the image plane comes to incline with respect to the parallax direction of the stereo imaging optical system. This is because, in order to bend the optical path such that both the chief rays come close to each other while the parallactic images remain proximate to each other, at least one of the first reflecting surface (the 1-$1^{st}$ and 2-$1^{st}$ reflecting surfaces) and the second reflecting surface (the 1-$2^{nd}$ and 2-$2^{nd}$ reflecting surfaces) in the light-guide optical systems must have its normal inclined with respect to a plane that includes the parallactic direction of the stereo imaging optical system. By inclining the direction of scanning by the image pickup device in such a way as to lie along this inclining image plane, it is thus possible to reduce image processing time.

According to the $63^{rd}$ aspect of the invention, any one of the $49^{th}$ to $62^{nd}$ stereo imaging units is further characterized in that said single image pickup device is located such that the parallactic image formed via said first objective lens group and the parallactic image formed via said second objective lens group are projected side by side in a direction substantially orthogonal to the direction of scanning by said single image pickup device.

The advantage of, and the requirements for, the $63^{rd}$ stereo imaging unit is now explained.

With the image pickup device designed to have a vertically divided, real-time readable image-receiving plane, image information processing time can be shortened because real-time parallel processing can be implemented without recourse to any memory.

According to the $64^{th}$ aspect of the invention, any one of the $49^{th}$ to $63^{rd}$ stereo imaging units is further characterized by satisfying conditions (11), (12), (13) and (14):

$$-10.0 < f_{T1}/f_1 < -2.0 \tag{11}$$

$$-10.0 < f_{T2}/f_2 < -2.0 \tag{12}$$

$$1.5 < f_K/f_1 < 10 \tag{13}$$

$$1.5 < f_K/f_2 < 10 \tag{14}$$

where $f_{T1}$ is the focal length of said first objective lens group, $f_{T2}$ is the focal length of said second objective lens group, $f_K$ is the focal length of said image-formation lens group, $f_1$ is the focal length of the stereo imaging optical system including said first objective lens group, and $f_2$ is the focal length of the stereo imaging optical system including said second objective lens group.

The advantages of, and the requirements for, the $64^{th}$ stereo imaging units are now explained.

Conditions (11), (12), (13) and (14) are provided to define the focal length of each objective lens group and the focal length of the image-formation lens group in terms of the focal length of the stereo imaging optical system so as to obtain images having a suitable angle of view and a suitable parallax throughout the stereo imaging optical system. As the lower limits of −10.0 to conditions (11) and (12) are not reached or the refracting power of each objective lens group becomes weak, any desired wide angle of view cannot be obtained with an increase in the diameter of the objective lens groups.

On the other hand, as the upper limits of −2.0 to conditions (11) and (12) are exceeded, the spacing between both the lens groups becomes narrow, rendering it difficult to bend an optical path with a plurality of mirrors interposed between them.

Again, as the lower limits of 1.5 to conditions (13) and (14) are not reached or the refracting power of the image-formation lens group becomes weak, the spacing between both the lens groups becomes narrow, and as the upper limits of 10 thereto are exceeded or the refracting power of the image-formation lens group becomes small, the spacing between both the lens groups becomes too wide, resulting in a bulky unit.

The lower limit to condition (11), and (12) should be set at preferably −8.0, and more preferably −6.0.

The upper limit to condition (11), and (12) should be set at preferably −3.0, and more preferably −4.0.

The lower limit to condition (13), and (14) should be set at preferably 2.5, and more preferably 3.0.

The upper limit to condition (13), and (14) should be set at preferably 7.0, and more preferably 5.0.

According to the $65^{th}$ aspect of the invention, any one of the $49^{th}$ to $64^{th}$ stereo imaging units is further characterized by satisfaction of condition (15):

$$-0.4 < \beta_K < -0.06 \tag{15}$$

where $\beta_K$ is the transverse magnification of said image-formation lens group.

The advantages of, and the requirements for, the $65^{th}$ stereo imaging unit are now explained.

Condition (15) is provided to define the transverse magnifications of the image-formation lens groups. As the lower limit of −0.4 to condition (15) is not reached, there is an increased back focus, leading to a bulky optical system. On the other hand, as the upper limit of −0.06 to condition (15) is exceeded, any wide angle-of-view arrangement is unachievable and the diameter of the objective lens groups become too large, because the refracting power of the objective lens groups becomes weak. In addition, the diameter of the objective lens groups becomes too large.

The lower limit to condition (15) should be set at preferably −0.3, and more preferably −0.25.

The upper limit to condition (15) should be set at preferably −0.1, and more preferably −0.15.

Enumerated below are the values of conditions (11) to (15) in the stereo imaging optical systems in the example to be given later.

$f_{T1} = -22.908$
$f_{T2} = -22.908$
$f_K = 18.714$
$f_1 = 5.00$
$f_2 = 5.00$
$f_{T1}/f_1 = -4.57$
$f_{T2}/f_2 = -4.57$
$f_K/f_1 = 3.74$
$f_K/f_2 = 3.74$
$\beta_K = -0.218$ According to the $66^{th}$ aspect of the invention, any one of the $49^{th}$ to $65^{th}$ stereo imaging units is further characterized by comprising a stop member interposed between said first and second objective lens groups and said image-formation lens group for forming an exit pupil.

The advantages of, and the requirements for, the $66^{th}$ stereo imaging unit are now explained.

With this arrangement, it is easy to make an incident light beam on the image pickup device telecentric. It is also possible to keep the objective lens groups and the image-formation lens group against increasing in diameter.

According to the $67^{th}$ aspect of the invention, the $66^{th}$ stereo imaging unit is further characterized by satisfying condition (16) while an optical path is taken apart:

$$0.03 < D_{PK}/f_K < 1.5 \tag{16}$$

where $D_{PK}$ is the distance from said stop member to the entrance surface of said image-formation lens group while an optical path is taken apart, and $f_K$ is the focal length of said image-formation lens group.

The advantages of, and the requirements for, the $67^{th}$ stereo imaging unit are now explained.

As the lower limit of 0.03 to condition (16) is not reached, the effect of making the arrangement telecentric toward the image pickup device side becomes small. As the upper limit of 1.5 is exceeded, on the other hand, an off-axis light beam is susceptible of shading by the image-formation lens group.

The lower limit to condition (16) should be set at preferably 0.1, and more preferably 0.2.

The upper limit to condition (16) should be set at preferably 1.0, and more preferably 0.5.

Regarding condition (16), the stereo imaging optical system in the example to be given later has the following values.

$D_{PX}$=8.24
$f_K$=18.714
$D_{PK}/f_K$=0.440

According to the 68th aspect of the invention, any one of the 49th to 67th stereo imaging units is further characterized by comprising field-limitation members for forming said at least two parallactic images on the image pickup plane of said image pickup device in a separate fashion.

The advantages of, and the requirements for, the 68th stereo imaging unit are now explained.

Preferably, the field-limitation members should be located in any desired positions in the left and right optical paths in such a way as to fend off overlapping of the left and right parallactic images on the image pickup plane. When, in this case, there are no intermediate image-formation positions in the left and right optical paths, the field is limited by shading.

According to the 69th aspect of the invention, the 68th stereo imaging unit is further characterized in that at least one of said field-limitation members is a field mask that is located on the subject side of said objective lens groups and has a substantially rectangular opening.

The advantages of, and the requirements for, the 69th stereo imaging unit are now explained.

The field mask, if it is located at a position of the objective lens groups near to the subject, makes it easy to implement a field-stop function. The field mask, if it is configured in the shape of the image to be obtained (in a substantially rectangular shape), could have a combined field-stop function and hood function.

According to the 70th aspect of the invention, the 69th stereo imaging unit is further characterized in that said field mask is located at a position eccentric with respect to the optical axes of said objective lens groups.

The advantages of, and the requirements for, the 70th stereo imaging unit are now explained.

When it is desired to form parallactic images at any desired area of the image pickup device, it is preferable to locate the field mask at a position eccentric with respect to the objective lens groups regardless of their inclinations.

According to the 71st aspect of the invention, any one of the 49th to 70th stereo imaging units is further characterized in that, given that the first chief ray is defined by the center ray of a light beam that reaches the center of a parallactic image projected onto said single image pickup device via said first objective lens group, said first light-guide optical system and said image-formation lens group and the second chief ray is defined by the center ray of a light beam that reaches the center of a parallactic image projected onto said single image pickup device via said second objective lens group, said second light-guide optical system and said image-formation lens group, the contour of a lens in at least either one of said first objective lens group and said second objective lens group is in a non-rotationally symmetric shape that comes closest to the optical axis of said lens group on a side thereof, on which the associated chief ray is not incident.

The advantages of, and the requirements for, the 71st stereo imaging unit are now explained.

Portions in the objective lens groups other than their effective surfaces should preferably be removed. Especially when the objective lens groups are decentered with respect to the chief rays, some portions of the objective lens groups on their sides on which the chief rays are not incident are unnecessary. With the arrangement of the 44th aspect of the invention, size reductions can be achieved. This arrangement also permits the objective lens groups to function as a part of the field-limitation members.

According to the 72nd aspect of the invention, there is provided a stereo imaging system which comprises a stereo imaging unit as recited in any one of the 49th to 71st aspects of the invention, an image processor that is operable in response to an image from said stereo imaging unit to calculate a subject distance, producing a distance signal and a controller that is operable in response to said distance signal to control other device.

According to the 73rd aspect of the invention, the 72nd stereo imaging unit is further characterized in that said other device is a display device.

According to the 74th aspect of the invention, the 72nd stereo imaging unit is further characterized in that said other device is an alarm device.

According to the 76th aspect of the invention, the 72nd stereo imaging unit is further characterized in that said other device is an operating device.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENT

The stereo imaging unit of the invention is now explained with reference to some specific embodiments.

Figure 1A:
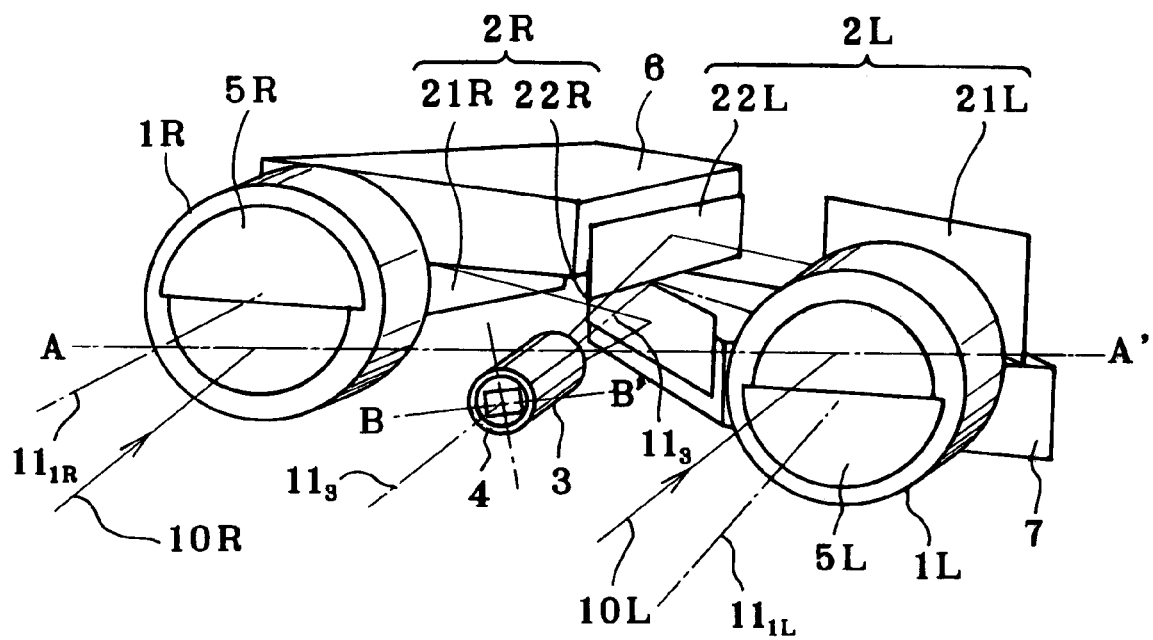
FIGS. 1(a) and 1(b) are illustrative in perspective of exemplary constructions of the stereo imaging unit according to one embodiment of the invention.
Figure 1B:
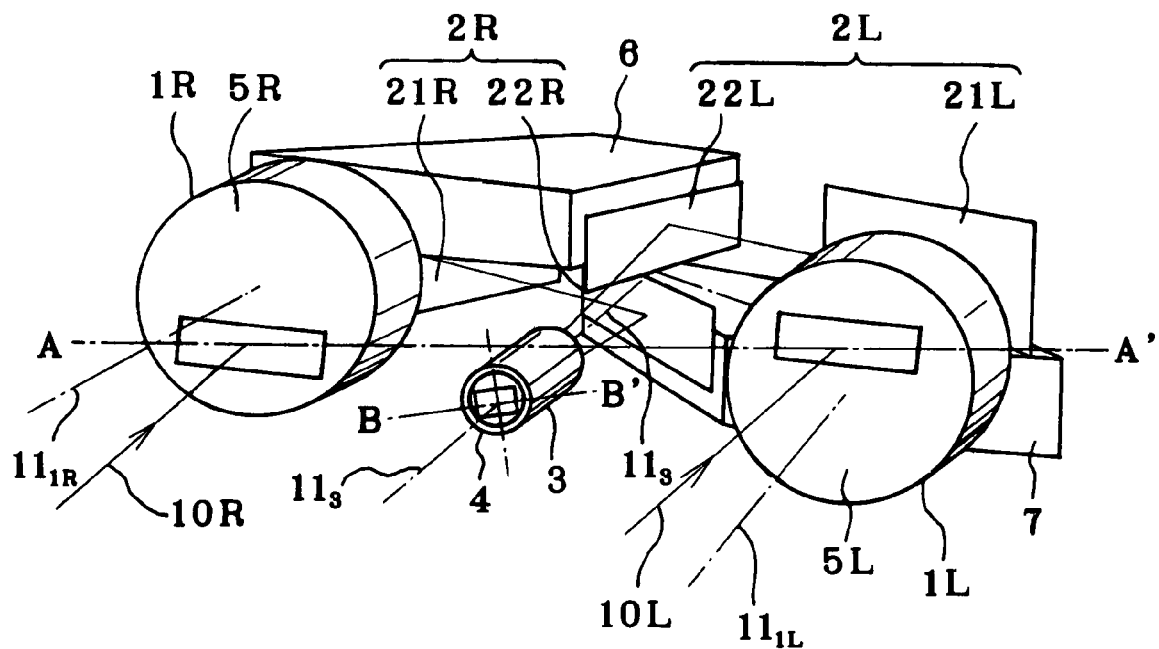

FIGS. 1(a) and 1(b) are illustrative in perspective of exemplary constructions of one embodiment of the stereo imaging unit according to the invention. The constructions of FIGS. 1(a) and 1(b) are the same with the exception of the shapes of field masks 5L and 5R; they will be explained as the same stereo imaging unit, unless otherwise specified.

In what follows, "L" and "R" are suffixed to numerical references to tell components or elements belonging to the left optical path from those belonging to the right optical path, unless otherwise stated.

The stereo imaging unit is built up of, corresponding to left and right optical paths, a left objective lens group 1L and a right objective lens group 1R that are a left negative lens group and a right negative lens group, respectively; a first reflecting surface 21L and a second reflecting surface 22L for reflecting light incident from the objective lens group 1L thereon in this order, and a first reflecting surface 21R and a second reflecting surface 22R for reflecting light incident from the objective lens group 1R thereon in this order; an image-formation lens group 3 that receives light reflected at the left and right second reflecting surfaces 22L and 22R and is a common positive lens group; and a common, single image pickup device 4 that is located on the image plane of the image-formation lens group 3.

Here the direction of light reflected at the first reflecting surface 21L, 21R and the second reflecting surface 22L, 22R is explained. As can be seen from FIGS. 1(a) and 1(b), the left first reflecting surface 21L bends an optical path for light incident from the left objective lens group 1L thereon at an angle of substantially 90° toward the right objective lens group 1R, and the second reflecting surface 22L bends the thus bent optical path at an angle of substantially 90° in a direction substantially parallel with an optical path that enters the left objective lens group 1L and in the opposite direction, entering light in the common image-formation lens group 3. Likewise, the right first reflecting surface 21R bends an optical path for light incident from the right objective lens group 1R thereon at an angle of substantially 90° toward the left objective lens group 1L, and the second reflecting surface 22R bends the thus bent optical path at an angle of generally 90° in a direction substantially parallel with an optical path that enters the right objective lens group 1R and in the opposite direction, entering light in the common image-formation lens group 3.

Therefore in the stereo imaging unit, the common image-formation lens group 3 and the common image pickup device 4 can be interposed between the left and right objective lens groups 1L and 1R. Then, the left-and-right direction width is determined by a distance between the ends of the left and right objective lens groups 1L and 1R (i.e., the base line length plus the aperture of one objective lens group), the depth-wise thickness with respect to a subject is determined by a distance between the front end surfaces of the objective lens groups 1L, 1R and the rear end surface of light-guide optical systems 2L, 2R made up of the first reflecting surfaces 21L, 21R and the second reflecting surfaces 22L, 22R, and the height is substantially set at smaller than the aperture of the objective lens groups 1L, 1R)—this is because portions in the objective lens groups 1L, 1R other than their effective areas can be trimmed off. It is thus possible to obtain a compact stereo imaging unit.

A left parallactic image of a binocular parallactic image, formed on the image pickup device 4 by light incident from the left objective lens group 1L on the image-formation lens group 3 by way of the first reflecting surface 21L and then the second reflecting surface 22L, is projected onto a lower half of a rectangular image pickup plane of the image pickup device 4 in an inverted fashion, and a right parallactic image of the binocular parallactic image, formed on the image pickup device 4 by light incident from the right objective lens group 1R on the image-formation lens group 3 by way of the first reflecting surface 21R and then the second reflecting surface 22R, is projected onto an upper half of the rectangular image pickup plane of the image pickup device 4 in an inverted fashion.

Here the parallactic direction of the whole stereo imaging unit optical system is now explained. Given that left and right chief rays are indicated at 10L and 10R, that parallactic direction is defined by the direction of a straight line A–A' that connects points of incidence of the left and right chief rays 10L, 10R on the entrance lens surfaces of the left and right objective lens groups 1L, 1R or the field masks 5L, 5R, and the parallactic direction of the parallactic image projected onto the image pickup device 4 is defined by the direction of a straight line B–B' parallel with the rectangular sides of the image pickup device 4. As can be seen from FIGS. 1(a) and 1(b), therefore, the parallactic direction A–A' of the whole optical system for this stereo imaging unit is not parallel with the parallactic direction B–B' of the parallactic image projected onto the image pickup device 4; the parallactic direction B–B' is inclined with respect to the parallactic direction A–A'. This is because the first reflecting surfaces 21L, 21R and the second reflecting surfaces 22L, 22R are inclined biaxially rather than a simple axis orthogonal to the same plane, so that the image of the subject projected onto the image pickup device 4 rotates. Here, the left and right chief rays 10L and 10R are defined by the center rays of light beams arriving at the centers of the left and right parallactic images formed on the image pickup device 4, respectively, by light incident from the objective lens groups 1L and 1R on the image-formation lens group 3 by way of the first reflecting surfaces 21L and 21R, and then the second reflecting surfaces 22L and 22R.

Here, the stereo imaging optical system in this embodiment is briefly explained. The left and right chief rays 10L and 10R are defined as mentioned above. On the other hand, the left objective lens group 1L has an optical axis (a center axis or axis of rotation) $11_{1L}$, the right objective lens group 1R has an optical axis (a center axis or axis of rotation) $11_{1R}$, and the image-formation lens group 3 has one optical axis (a center axis or axis of rotation) $11_3$. Given that an optical path at the first reflecting surfaces 21L, 21R and the second reflecting surfaces 22L, 22R is taken apart to take the left and right optical systems (lens systems) as being each one lens system, the optical axis $11_{1L}$ of the left objective lens group 1L and the optical axis $11_3$ of the image-formation lens group 3 are lined up into one optical axis, and the optical axis $11_{1R}$ of the right objective lens group 1R and the optical axis $11_3$ of the image-formation lens group 3 are lined up into one optical axis. Left and right light beams from the same subject enter the left and right objective lens groups 1L and 1R along the left and right chief rays 10L and 10R, respectively, forming left and right parallactic images on the lower and upper halves of the rectangular image pickup plane of the image pickup device 4 in an inverted fashion.

It is here noted that the chief rays 10L and 10R incident on the left and right objective lens groups 1L and 1R are not in alignment with the optical axes $11_{1L}$ and $11_{1R}$ thereof; the left incident chief ray 10L makes an upward angle with the left optical axis $11_{1L}$ and the right incident chief ray 10R makes a downward angle with the right optical axis $11_{1R}$. However, it is noted that in order to form the left and right parallactic images, the chief rays 10L and 10R incident on the left and right objective lens groups 1L and 1R make an internal angle depending on a subject distance while they are parallel with each other or lie in much the same plane, and so the optical axes $11_{1L}$ and $11_{1R}$ of the left and right objective lens groups 1L and 1R are mutually twisted into 180° rotational symmetry with respect to the optical axis $11_3$ of the image-formation lens group 3.

On the entrance sides of the left and right objective lens groups 1L and 1R, the field masks 5L and 5R are located to transmit image-formation light beams with centers on the chief rays 10L and 10R, respectively, and limit unnecessary light. In FIG. 1(a), a relatively simple field mask 5L is provided to cover a substantially lower half of the left objective lens group 1L and a similar field mask 5R is provided to cover a substantially upper half of the right objective lens group 1R, and in FIG. 1(b), an oblong, rectangular field mask 5L is provided to cover a substantially lower half of the left objective lens group 1L thereby limiting a parallactic image formed on the image pickup device 4 to a horizontally long, rectangular shape and a similar field mask 5R is provided to cover a substantially upper half of the right objective lens group 1R thereby limiting a parallactic image formed on the image pickup device 4 to a horizontally long, rectangular shape.

The first reflecting surfaces 21L and 21R are provided in such a size and shape so as not to limit effective light beams transmitting through the objective lens groups 1L and 1R, and inclined at an angle of 45° in the horizontal direction and at an angle of a few degrees toward the image pickup device 4 in the vertical direction, so that light beams reflected thereat are incident on the second reflecting surfaces 22L and 22R. The second reflecting surfaces 22L and 22R are inclined at an angle of substantially 90° in the horizontal direction and at a minute angle toward the image pickup device in the vertical direction, so that light beams reflected thereat are incident on the image-formation lens group 3. Referring to the second reflecting surfaces 22L and 22R as shown in FIGS. 1(a) and 1(b), they are positioned such that the upper, left second reflecting surface 22L and the lower, right second reflecting surface 22R cross each other as viewed from the vertical direction, so that light beams coming from the left-and-right direction are polarized in such a way as to enter the image-formation lens group 3 from the vertical direction. It is here noted that the second reflecting surfaces 22L and 22R form together a stop member to create an exit pupil.

The light beams limited by the field masks 5L and 5R pass through low-pass filters, not shown, and then enter the image-formation lens group 3, thereby forming the respective parallactic images on the associated lower and upper half areas of the image pickup device 4. Through the action of the field masks 5L and 5R, the upper and lower parallactic images are formed on the image pickup device 4 in a parallel, separate fashion without overlapping.

It is here important that a pair of the same components be located at left and right positions of 180° rotational symmetry about the optical axis $11_3$ of the image-formation lens group 3. More specifically, a pair of the same objective lens groups 1L and 1R as well as a pair of the same light-guide optical systems 2L and 2R should be located at left and right positions of 180° rotational symmetry about the optical axis $11_3$ of the image-formation lens group 3.

In this case, the left and right parallactic images can be picked up at wide angles of view, because the objective lens group 1L, 1R has negative refracting power and the image-formation lens group 3 has positive refracting power and, hence, each of the left and right optical systems is of retrofocus construction.

In FIGS. 1(b) and 1(b), it is noted that reference numerals 6 and 7 stand for upper and lower spaces for receiving circuit components in the stereo imaging unit.

The stereo imaging optical system in the instant stereo imaging unit are now explained in detail.

As described above, the left and right objective lens groups 1L, 1R as well as the left and right light-guide optical systems 2L, 2R are of the same construction and located at positions of 180° rotational symmetry about the optical axis $11_3$ of the image-formation lens group 3, while the optical axes $11_{1L}$ and $11_{1R}$ of the objective lens groups 1L and 1R and the optical axis 113 of the image-formation lens group 3 are lined up into one optical axis. For this reason, the left optical system is mainly now explained.

Figure 2:
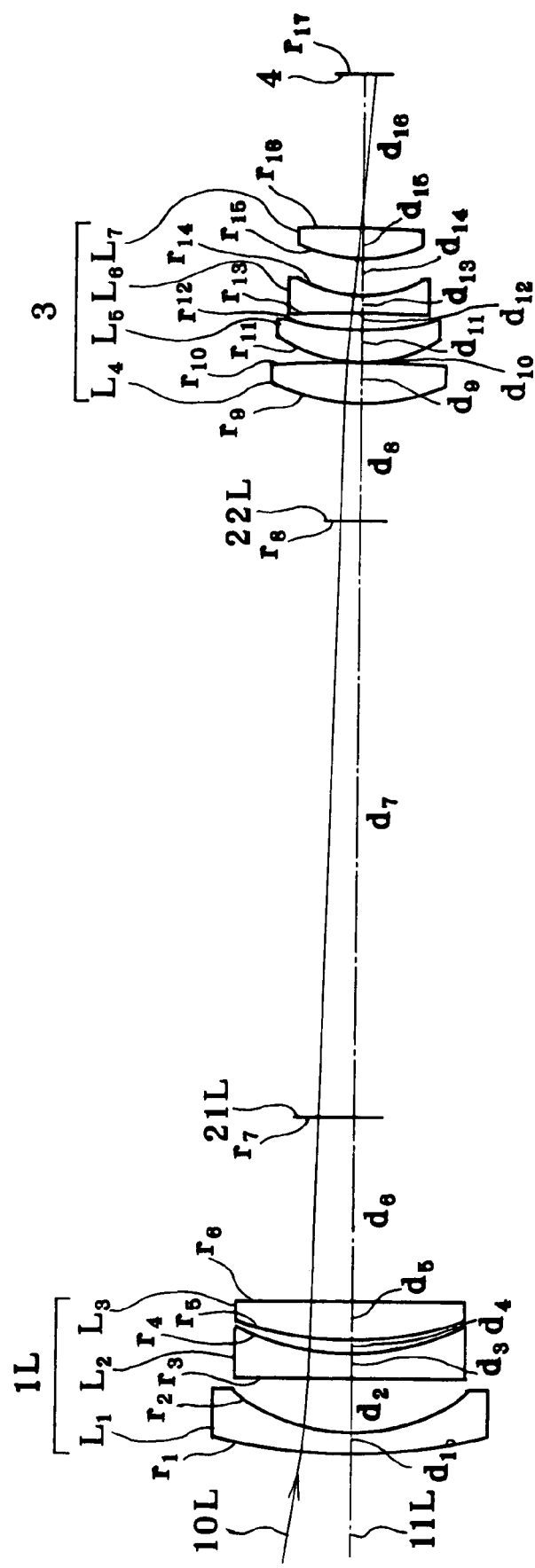
FIG. 2 is a taken-apart optical path diagram for the left optical system in the embodiment of FIGS. 1(a) and 1(b).

FIG. 2 is a taken-apart optical path diagram for the left optical system made up of an objective lens group 1L, a first reflecting surface 21L, a second reflecting surface 22L and an image-formation lens group 3. This is a rotationally symmetric optical system with its center on an optical axis 11L, as shown by a dotted line. Typically, the first and second reflecting surfaces 21L and 22L are represented by straight lines vertical to the optical axis 11L. With the optical path not taken apart, the optical system arrangement is not of rotational symmetry, because the first and second reflecting surfaces 21L and 22L are biaxially inclined about the optical axis 11L, as will be described later.

As can be seen from FIG. 2, the left objective lens group 1L is a three-lens group that is of negative power and consists of a negative meniscus lens $L_1$ convex on its object side, a planoconcave negative lens $L_2$ and a positive meniscus lens $L_3$ convex on its object side; the image-formation lens group 3 is a four-lens group that is of positive power and consists of a double-convex positive lens $L_4$, a positive meniscus lens $L_5$ convex on its object side, a planoconcave negative lens $L_6$ and a double-convex positive lens $L_7$; and a stop is located at a position of the second reflecting surface 22L (the stop is formed by the contour of the second reflecting surface 22L). The angle of view (the angle which the optical axis 11L makes with the chief ray 10L), at which the chief ray 10L, arriving at the center of the left parallactic image formed on the lower half of the image pickup plane of the image pickup device 4 (the image plane), passes is 9.7°.

Lens data on this lens system will be tabulated in Table 1, given later. In Table 1, $r_1$, $r_2$ and so on stand for the radii of curvature of lens surfaces (including reflecting surfaces and the image plane) as counted in order from the entrance-side surface of lens $L_1$, $d_1$, $d_2$ and so on indicate the spacing between adjacent lens surfaces, and $v_{d1}$, $v_{d2}$ and so on represent the Abbe numbers of lenses. In Table 1, the full angle of view of this lens system itself is shown; however, the angle of view of the left optical system indicated is 14° in 2.7° to 16.7° in 9.7°±7° in the longitudinal (vertical) direction, and 42° in the left-and-right (horizontal or parallactic) direction.

Figure 3:
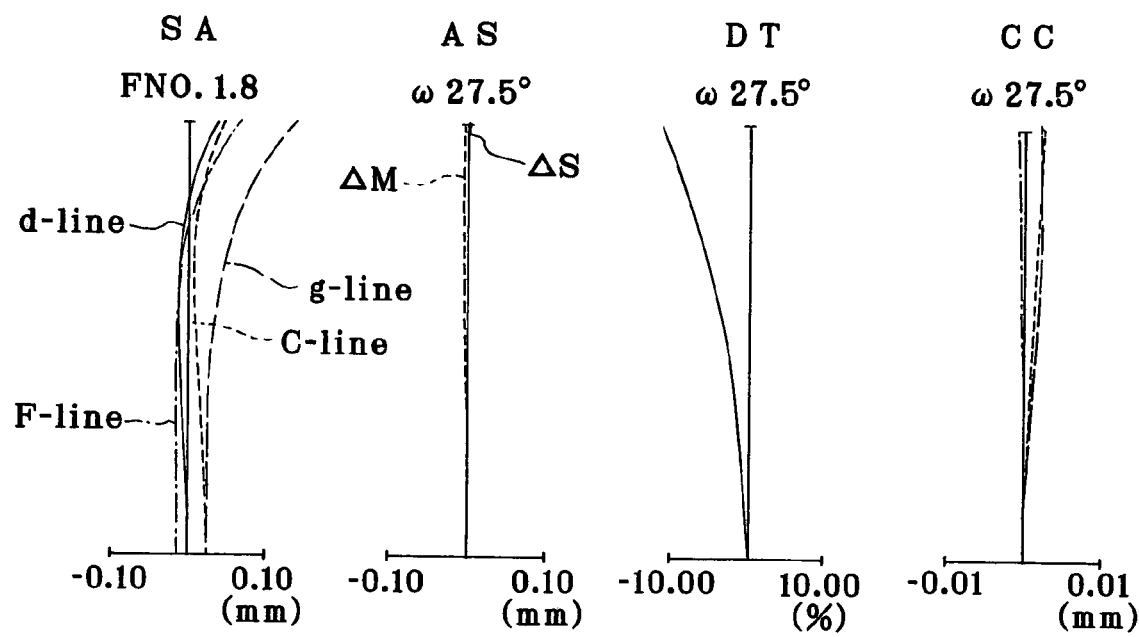
FIG. 3 is a longitudinal aberration diagrams for the lens system in the embodiment of FIG. 2.
Figure 4:
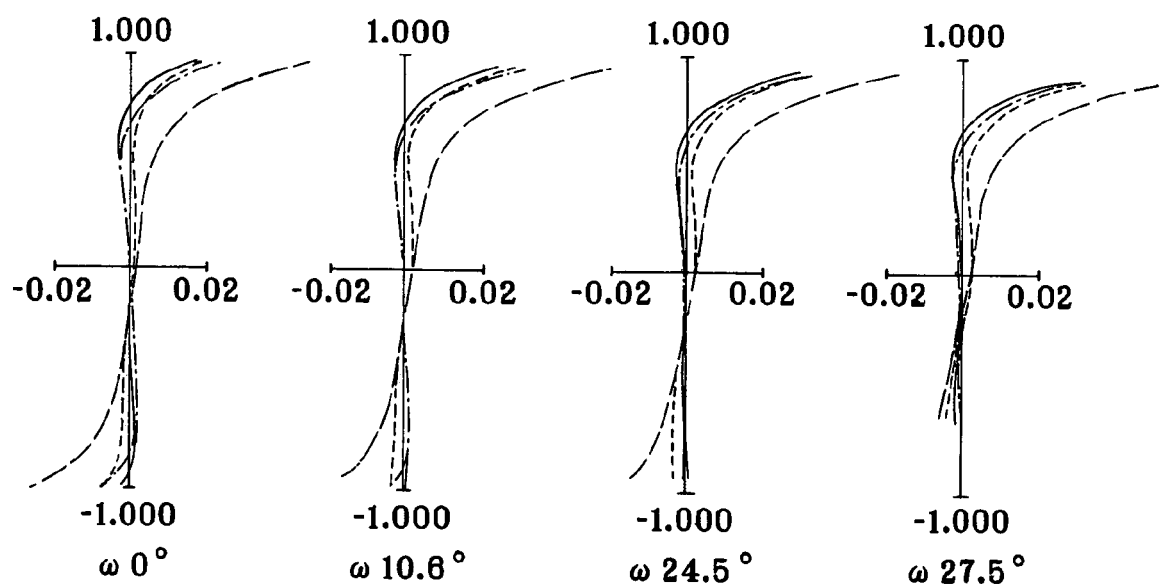
FIG. 4 is a transverse aberration diagrams for the lens system in the embodiment of FIG. 2.

FIGS. 3 and 4 are a longitudinal aberration diagram and a transverse aberration diagram for this lens system of this embodiment, respectively. In these aberration diagrams, "SA", "AS", "DT", "CC", and "ω" represent spherical aberrations, astigmatisms, distortions, chromatic aberrations of magnification, and angles of view of one optical system, respectively.

Referring here to the coordinates with respect to the center of the image plane (image pickup plane) of the image pickup device 4, the positive z-axis is the normal direction to the subject (coming down through the image plane), the positive x-axis is the direction from the image plane to the objective lens groups, and the y-axis is orthogonal to the z- and x-axes, giving a right-handed coordinate system.

Figure 5:
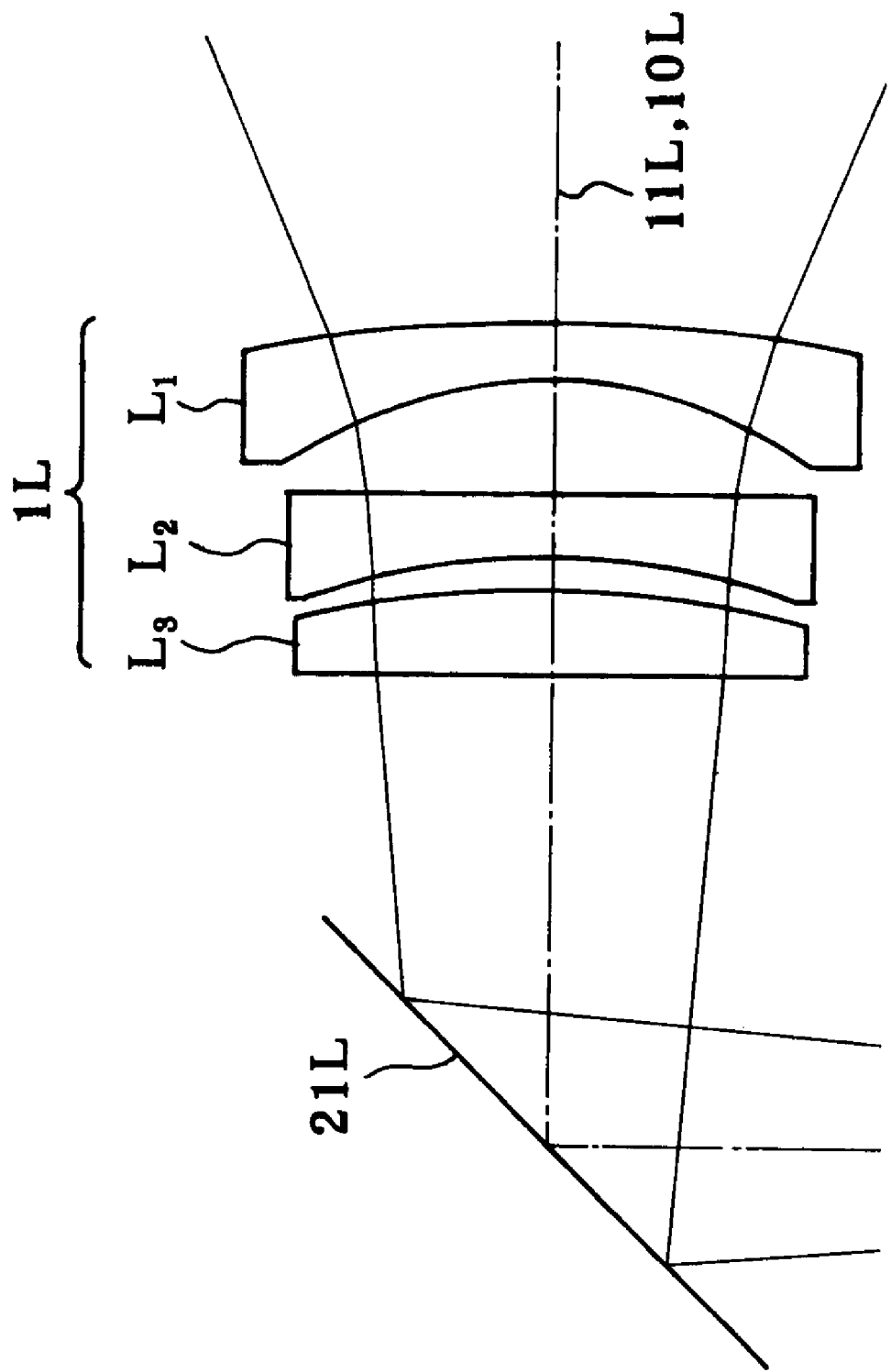
FIG. 5 is a diagram upon projection onto an x-z plane of the left optical system in the stereo imaging unit according to the embodiment of FIG. 2.
Figure 6:
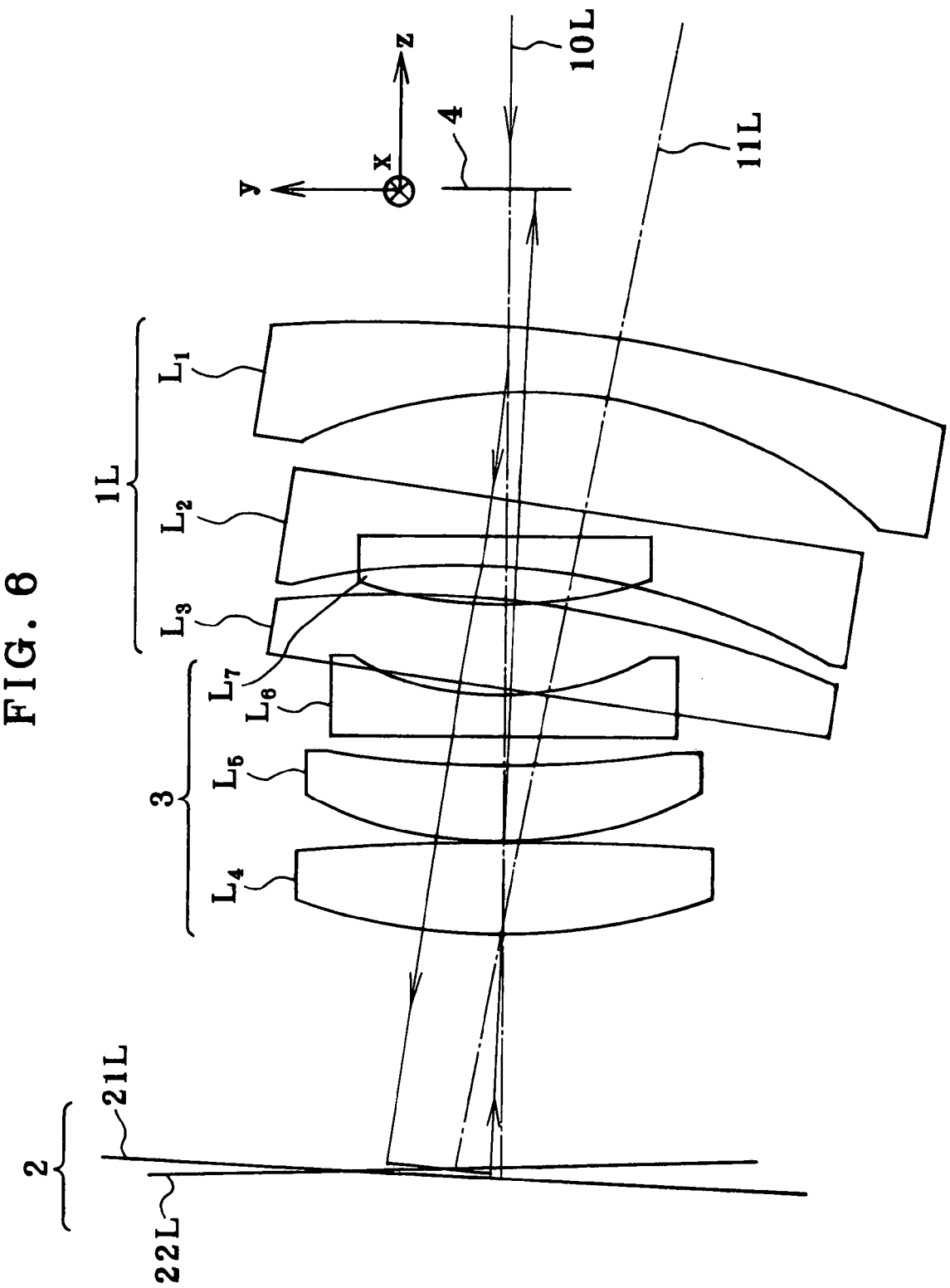
FIG. 6 is a diagram upon projection onto a y-z plane of the left optical system in the stereo imaging unit according to the embodiment of FIG. 2.

FIG. 5 is a diagram upon projection onto the x-z plane of the left optical system in the stereo imaging unit according to the instant embodiment, and FIG. 6 is a similar diagram upon projection onto the y-z plane. The first and second reflecting surfaces 21L and 22L are biaxially inclined, as already described. The inclination (rotation) of the first reflecting surface 21L, and the second reflecting surface 22L is defined as the angle of rotation about the y-axis; the position of the normal to each reflecting surface toward the positive z-axis direction is defined as the angle of rotation of 0°, provided that with respect to the positive y-axis direction of the coordinate system given for the center of the image plane, clockwise rotation and counterclockwise rotation are positive and negative, respectively. The x-axis of the coordinate system given for the center of the image plane is assumed to rotate with the rotation of each reflecting surface; that is, the x-axis is assumed to lie orthogonal to the y-axis in each reflecting surface. With respect to the newly determined position x-axis direction, clockwise rotation and counterclockwise rotation are defined as positive and negative, respectively.

In the instant embodiment, the angle of rotation about the y-axis of the first reflecting surface 21L is −44.6°, and the angle of rotation about the x-axis is +8°; and the angle of rotation of the second reflecting surface 22L about the y-axis is +45°, and the angle of rotation about the x-axis is −1.2°, as shown in Table 2.

The apex positions of lens surfaces (including reflecting surfaces and the image plane) in the coordinate system given with respect to the image plane of the image pickup device 4 are shown in Table 3, given later.

Figure 7:
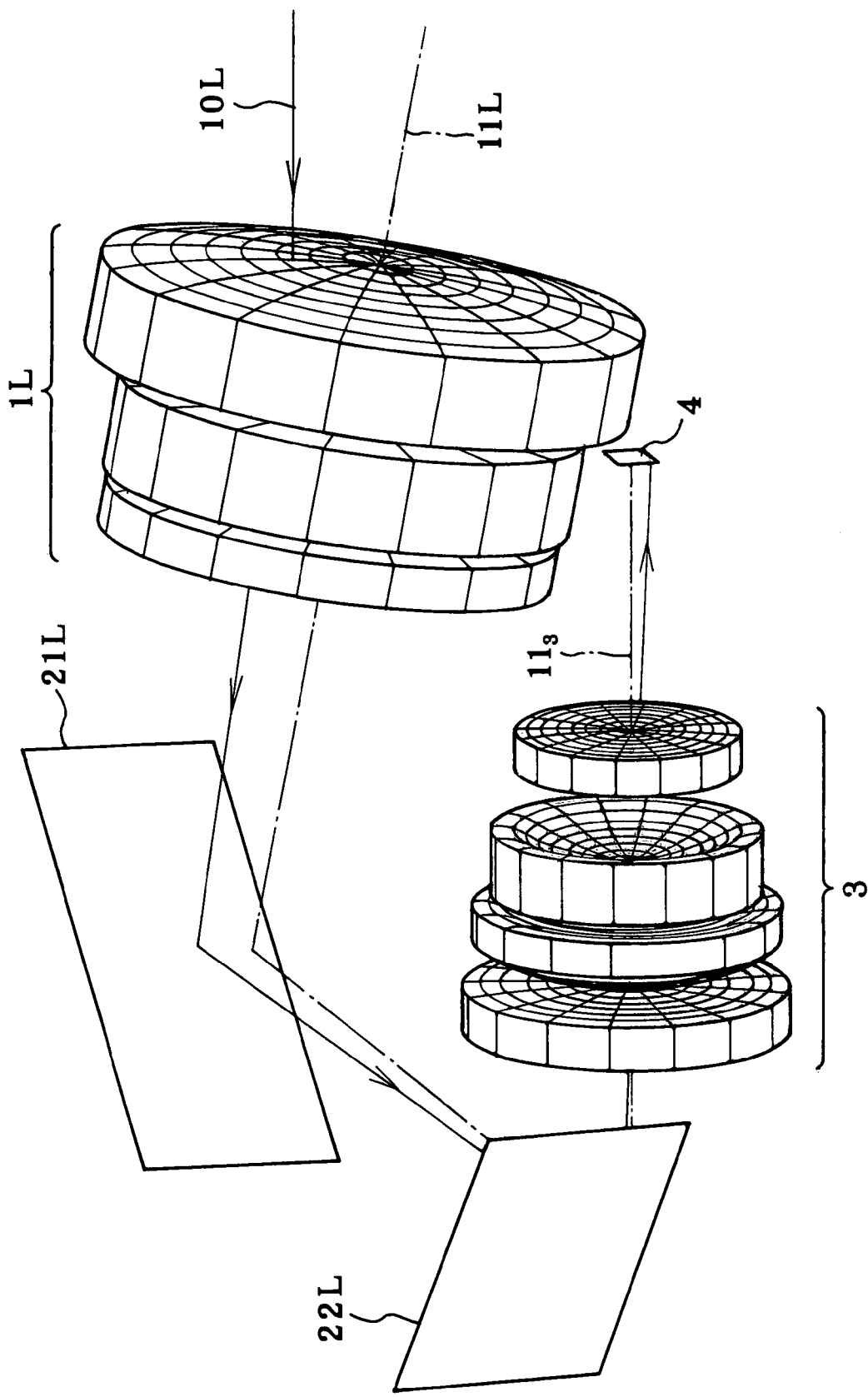
FIG. 7 is illustrative in perspective of the left optical system in the stereo imaging unit according to the embodiment of FIG. 2.

FIG. 7 is a perspective view of the left optical system shown in the taken-apart optical path diagram of FIG. 2, the diagram of FIG. 5 upon projection onto the x-z plane, and the diagram of FIG. 6 upon projection onto the y-z plane.

TABLE 1

(Lens Data)

| | | | | | | |
|---|---|---|---|---|---|---|
| $r_1 =$ | 46.993 | $d_1 =$ | 2 | $n_d =$ | 1.72916 | $v_{d1} =$ 54.68 |
| $r_2 =$ | 15.223 | $d_2 =$ | 4 | | | |
| $r_3 =$ | ∞ | $d_3 =$ | 2.26 | $n_d =$ | 1.7725 | $v_{d1} =$ 49.6 |
| $r_4 =$ | 22.203 | $d_4 =$ | 1.1 | | | |
| $r_5 =$ | 31.402 | $d_5 =$ | 3 | $n_d =$ | 1.78472 | $v_{d1} =$ 25.68 |
| $r_6 =$ | 358.141 | $d_6 =$ | 17 | | | |
| $r_7 =$ | ∞ (1st reflecting surface) | $d_7 =$ | 49.76 | | | |
| $r_8 =$ | ∞ (2nd reflecting surface) (Stop) | $d_8 =$ | 8.24 | | | |
| $r_9 =$ | 18.41 | $d_9 =$ | 3.13 | $n_d =$ | 1.7725 | $v_{d1} =$ 49.6 |
| $r_{10} =$ | −116.92 | $d_{10} =$ | 0.1 | | | |
| $r_{11} =$ | 11.528 | $d_{11} =$ | 2.7 | $n_d =$ | 1.72916 | $v_{d1} =$ 54.68 |
| $r_{12} =$ | 31.126 | $d_{12} =$ | 1 | | | |
| $r_{13} =$ | ∞ | $d_{13} =$ | 1.5 | $n_d =$ | 1.84666 | $v_{d1} =$ 23.78 |
| $r_{14} =$ | 9.136 | $d_{14} =$ | 3.14 | | | |
| $r_{15} =$ | 13.443 | $d_{15} =$ | 2.38 | $n_d =$ | 1.51633 | $v_{d1} =$ 64.14 |
| $r_{16} =$ | −193.123 | $d_{16} =$ | 11.7 | | | |
| $r_{17} =$ | ∞ (Image plane) | | | | | |
| Focal length | 5.0 mm | | | | | |
| F-number | 1.8 | | | | | |
| Full angle of view | 55.0° | | | | | |

TABLE 2

(Angle of inclination of reflecting surface)

| | Angle of rotation about the y-axis | Angle of rotation about the x-axis |
|---|---|---|
| 1st reflecting surface | −44.6° | +8.0° |
| 2nd reflecting surface | +45.0° | −1.2° |

TABLE 3

(Apex position of each surface)

| Surface No. | x-coordinates | y-coordinates | z-coordinates |
|---|---|---|---|
| 1 | 49.74 | −3.47 | −4.97 |
| 2 | 49.74 | −3.13 | −6.94 |
| 3 | 49.74 | −2.46 | −10.88 |
| 4 | 49.74 | −2.08 | −13.11 |
| 5 | 49.74 | −1.89 | −14.19 |
| 6 | 49.74 | −1.39 | −17.15 |
| 7 | 49.74 | 1.48 | −33.91 |
| 8 | 0.00 | 0.00 | −33.89 |
| 9 | 0.00 | 0.00 | −25.65 |
| 10 | 0.00 | 0.00 | −22.52 |
| 11 | 0.00 | 0.00 | −22.42 |
| 12 | 0.00 | 0.00 | −19.72 |
| 13 | 0.00 | 0.00 | −18.72 |
| 14 | 0.00 | 0.00 | −17.22 |
| 15 | 0.00 | 0.00 | −14.08 |
| 16 | 0.00 | 0.00 | −11.70 |
| 17 (Image plane) | 0.00 | 0.00 | 0.00 |

In Tables 1–3, dimensions are given in mm.

While the left optical system in the stereo imaging optical system according to the instant embodiment has been described, it is understood that the right optical system holds the image-formation lens group 3 in common, the right objective lens group 1R and the right light-guide optical system 2R are the same in construction as the left objective lens group 1L and the left light-guide optical system 2L, and the right objective lens group 1R and the right light-guide optical system 2R are located at mutually 180° rotationally symmetric positions about the optical axis of the image-formation lens group 3, so that the right parallactic image is formed on the upper half of the image pickup plane of the same image pickup device 4.

Figure 8:
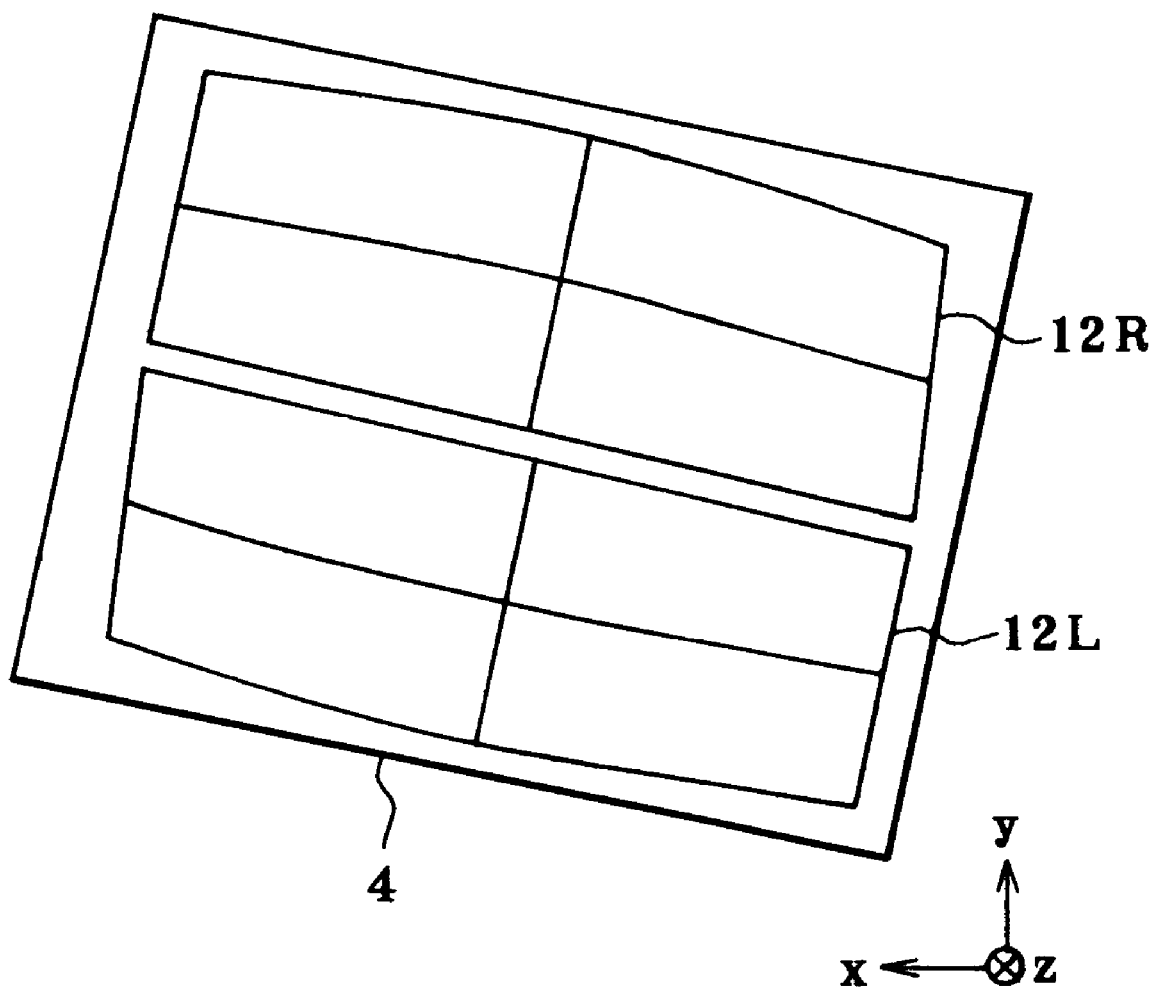
FIG. 8 is illustrative of the relations in position of the left and right parallactic images projected onto the image pickup plane of the image pickup device in the stereo imaging unit according to the embodiment of FIGS. 1(a) and 1(b).

FIG. 8 is illustrative of in what relations a left parallactic image 12L and a right parallactic image 12R are projected onto the image pickup plane of an image pickup device 4. As shown, the image pickup plane of the image pickup device 4 is configured in such a rectangular shape as to have a long-side direction and a short-side direction, wherein the long-side direction is clockwise rotated 13.1° toward the positive z-axis direction in association with the rotation of the left and right parallactic images 12L and 12R, and the right parallactic image 12R and the left parallactic image 12L are projected side by side in the short-side direction that is substantially orthogonal to the direction of scanning by the rectangular image pickup plane of the image pickup device 4. Here, a chief ray 10L to enter a left optical system is incident on a position of x=0.19 mm and y=−0.82 mm on the image pickup plane, and a chief ray 10R to enter a right optical system is incident on a position of x=−0.19 mm and y=0.82 mm symmetric with respect to that position. It is noted that the coordinate system used herein is the same as already defined about the image plane (image pickup plane) of the image pickup device 4.

As can be appreciated from the foregoing, the stereo imaging optical system according to the instant embodiment is designed such that incident light beams from the left and right objective lens groups 1L and 1R that are of the same construction and displaced in the parallactic direction are guided through the left and right light-guide optical systems 2L and 2R of the same construction comprising two reflecting surfaces 21L, 22R and 22L, 22R for each to an entrance pupil position of the common image-formation lens group 3, projecting the left and right parallactic images onto the lower and upper halves of the image plane of the image-formation lens group 3 via the lower and upper halves of the entrance pupil of the image-formation lens group 3. In addition, the objective lens groups 1L and 1R are located such that the objective lens group 1L and the image-formation lens group 3, and the objective lens group 1R and the image-formation lens group 3 form together the same coaxial optical system. To use light beams in the given range of upper and lower angles-of-view of equivalently one objective lens group to project the right and left parallactic images onto the same image plane in a separate fashion, it is thus required that the chief rays 10L, 10R to be incident on the left and right objective lens groups 1L, 1R be parallel with each other or form a small internal angle depending on a subject distance for the purpose of permitting those given upper and lower angles-of-view ranges to cover the same angle-of-view range for the subject. For this reason, the optical path must be guided through the light-guide optical systems 2L, 2R, each comprising a plurality of reflecting surfaces and located on the way to the image-formation lens group 3, in such a way that the optical axes $11_{1L}$, $11_{1R}$ of the left and right objective lens groups 1L, 1R are mutually twisted about the $11_3$ of the image-formation lens group 3 rather than parallel with each other. Accordingly, the mutual angle difference between the optical axes $11_{1L}$ and $11_{1R}$ of the left and right objective lens groups 1L and 1R becomes larger than that between the incident chief rays 10L and 10R. While the incident chief rays 10L, 10R are parallel with each other or form a small internal angle depending on the subject distance as described above, the optical axis $11_{1L}$ of the left objective lens group 1L and the optical axis $11_{1R}$ of the right objective lens group 1R are unparallel with, and opposite to, each other. It is here noted that the optical axis $11_{1L}$ of the left objective lens group 1L does not cross the optical axis $11_{1R}$ of the right objective lens group 1R, and the angle difference upon projection of one onto a plane including another has such relations as described above.

As set forth above, the image pickup plane of the image pickup device 4 is inclined in association with the rotation of the left and right parallactic images 12L, 12R, and so the parallactic direction of the parallactic images 12L, 12R should preferably stay substantially parallel with scanning lines by the image pickup device 4. Usually, images gleaned through an imaging system are transferred by horizontal scanning to a frame memory in an image processor system, where they are temporarily stored for a series of later image processing. As one exemplary image processing, consider now matching point retrieval for parallactic image stereo matching between the parallactic images 12L and 12R. It is when matching point retrieval is performed in the parallactic direction that efficiency becomes highest, because the matching points in the parallactic images are found in the parallactic direction.

From the standpoint of read addressing, efficiency becomes highest when image information stored in the frame memory as described above is read sequentially in storage order. In other words, if horizontal scanning is performed in the parallactic direction, it is then possible to pick up images in the most efficient fashion for later image processing.

Next consider parallel processing for faster image processing. In this case, too, only simple processing is needed, because processing of images on horizontal scanning lines shifted by given amounts in the vertical scanning direction involves only addition of offsets to pixel reading addresses. In either case, effective processing is implementable.

With the instant embodiment wherein the image pickup plane of the image pickup device 4 like a CCD is inclined and the parallactic direction is substantially parallel with scanning lines, therefore, image reading for faster-image processing is implementable without recourse of any squandering addressing.

Referring generally to the embodiments of FIGS. 1-8, the optical path is bent by the first reflecting surfaces 21L, 21R and the second reflecting surfaces 22L, 22R in the light-guide optical systems 2L, 2R in such a way that the image pickup plane of the common, single image pickup device 4 faces away from the subject side. However, it is acceptable that the light-guide optical systems 2L, 2R are designed such that the image pickup plane of the image pickup device 4 faces the subject side. This is now explained typically with reference to FIGS. 1(a) and 1(b). The first reflecting surface 21L on the left side bends an optical path coming from the left objective lens group 1L at an angle of substantially 90° toward the right objective lens group 1R, and the second reflecting surface 22L bends the thus bent optical path at an angle of substantially 90° in a direction substantially parallel with an optical path entering the left objective lens group 1L and in much the same direction of that entering optical path, entering the thus bent optical path in the common image-formation lens group 3. Likewise, the first reflecting surface 21R on the right side bends an optical path coming from the right objective lens group 1R at an angle of substantially 90° toward the left objective lens group 1L, and the second reflecting surface 22R bends the thus bent optical path at an angle of substantially 90° in a direction substantially parallel with an optical path entering the right objective lens group 1R and in much the same direction of that entering optical path, entering the thus bent optical path in the common image-formation lens group 3. In this case, too, the left and right objective lens groups 1L, 1R as well as the left and right light-guide optical systems 2L, 2R could be of the same construction and located at mutually 180° rotationally symmetric positions about the optical axis $11_3$ of the image-formation lens group 3, and the optical axes $11_{1L}$, $11_{1R}$ of the left and right objective lens groups 1L, 1R and the optical axis $11_3$ of the image-formation lens group 3 could be lined up into one optical axis.

As can also be seen from FIGS. 1(a) and 1(b), the light beams incident on the objective lens groups 1L, 1R are limited by the field masks 5L, 5R. The opening in each field mask 5L, 5R is configured in a semi-circular shape substantially about each chief ray 10L, 10R or in a rectangular shape that is oblong in the parallactic direction. Those openings are located at positions off the optical axes $11_{1L}$, $11_{1R}$ of the objective lens groups 1L, 1R, and effective areas through which light beams incident on the objective lens groups 1L, 1R pass are eccentric with respect to the optical axes $11_{1L}$, $11_{1R}$, too. Therefore, when portions in the objective lens groups 1L, 1R other than those effective areas are trimmed off, it is preferable that trimming is carried out such that the contour of a lens in at least either one of the objective lens groups 1L, 1R is in a non-rotationally symmetric shape that comes closest to the optical axes $11_{1L}$, $11_{1R}$ on a side, on which the chief rays 10L, 10R are not incident.

Figure 9:
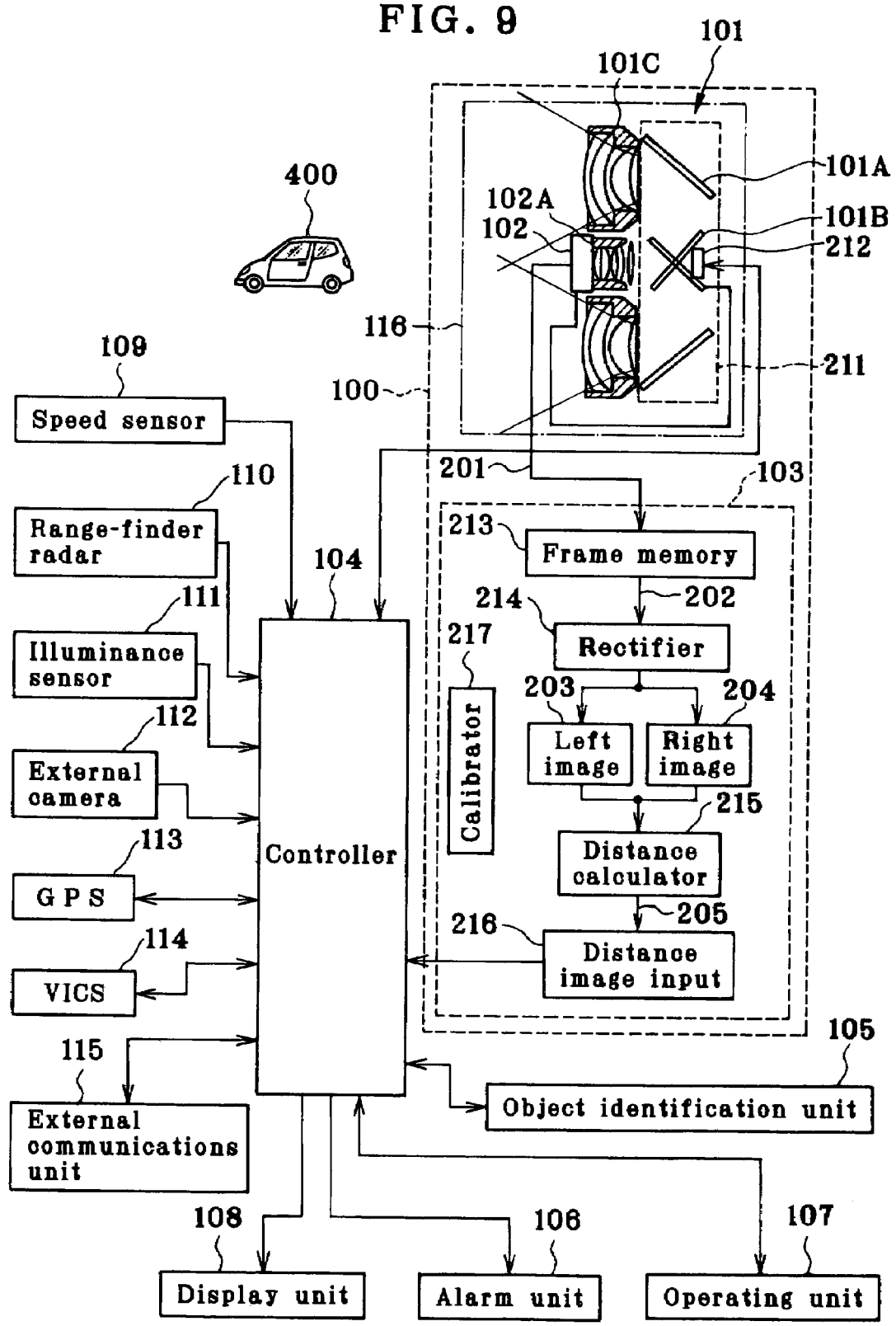
FIG. 9 is a block diagram for a stereo imaging system to which the stereo imaging unit according to the embodiment of the invention is applied.

FIG. 9 is typically illustrative of the construction of a stereo imaging system to which one stereo imaging unit embodiment of the invention is applied. The stereo imaging system is now explained as an onboard system.

That is, this stereo imaging system is made up of a distance image input unit 100, a control unit 104, an object identification unit 105, an alarm unit 106, a operating unit 107, a display unit 108, a speed sensor 109, a range-finder radar 110, an illuminance sensor 111, an external camera 112, a GPS (global poisoning system) 113, a VICS (vehicle information and communications system) 114 and an external communications unit 115.

Here the aforesaid distance image input unit 100 is built up of a stereo imaging unit 116 having an image pickup device 102 for phototaking a subject 400 and a stereo imaging optical system 101 mounted in front of that image pickup device 102, and a distance image processor 103 for measuring a distance image 205 of the subject 400.

As is the case with generally available video cameras, digital still cameras or the like, the stereo imaging unit 116 is optionally provided with a phototaking stop controller (not shown), a phototaking focus controller (not shown), a phototaking shutter speed controller (not shown) and a sensitivity controller (not shown).

The stereo imaging optical system 101 includes a reflecting optical system 211 comprising a plurality of mirror (a pair of mirrors 101A and 101B). This reflecting optical system 211 is mounted in front of a forward filter group 102A in such a way that images of the subject 400 incident from an objective lens group 101C and coming from different points of view are formed on the image pickup device 102 through a relay lens group 101D via the filter group 102A.

A stereo image 201 phototaken at the stereo imaging unit 116, i.e., one captured at the image pickup device 102 is fed to the distance image processor 103 as shown in FIG. 9, where it is processed into a three-dimensional distance image 205 that is in turn sent to the controller 104 and object identification unit 105.

It is noted that the term "distance image" used herein stands for an image having distance information in a subject's image pixel.

It is noted that reference numeral 212 in FIG. 9 is indicative of an exposure controller that is connected to the aforesaid phototaking stop controller, phototaking focus controller, phototaking shutter speed controller and sensitivity controller that the stereo-imaging unit 116 has, all not shown. The exposure controller 212 is also connected to the controller 104 for controlling the imaging unit 116 in dependence on an exposure value calculated on the basis of brightness information from the image pickup device 102.

As described above, the stereo image 201 picked up at the image pickup device 102 is entered in the distance image processor 103. The stereo image 201 is further entered in a frame memory 213, presenting a digital image 202.

The output of the frame memory 213 is entered in a rectifier 214, from which a left image 203 and a right image 204 are sent out to a distance calculator 215. The distance calculator 215 delivers a three-dimensional image 205 to the object identification unit 105 by way of a distance image output 216. The distance calculator 215 also delivers a two-dimensional image (stereo image 201), distance image 205, etc. to the controller 104.

It is noted that the distance image processor 103 also includes a separate calibrator 217 that delivers a rectification parameter to the rectifier 214, a distance-calculation parameter to the distance calculator 215 and an object-identification parameter to the object identification unit 105.

The object identification unit 105 makes use of the entered three-dimensional distance image 205 to identify an object or an object area present therein and, delivers out the resulting object data (not shown).

Each of the components in the distance image processor 103 could be implemented on computer software.

The controller 104 has a role in integration of image information and vehicle information. For instance, it is operable to display the results of processing at the distance image processor 103 on the display unit 108, make an analysis of distance information obtained at the distance image processor 103, information from the speed sensor 103, etc. to actuate the alarm unit 106 to give an alarm, and control the operating unit 107 to urge a driver to drive carefully. The alarm unit 106 comprises a voice-warning device, a vibrator and so on. For instance, the voice-warning device produces voices from a speaker or the like, and the vibrator forces a driver's seat to vibrate to give an alarm to the driver.

Although how to operate the system incorporating the stereo imaging unit is not explained at great length because of having no direct relation to the invention, it is noted that image information obtained from the stereo imaging unit 116 of the invention and the distance image input unit 100 and vehicle information garnered from various sensors can be integrated to display the image information on the display unit 108, actuate the alarm unit 106 to issue an alarm, and control or otherwise operate the operating unit 107, thereby urging the driver to drive carefully.

For instance, as the vehicle comes too close to a subject in front, not only a cautionary display or alarm can be shown or issued but also the operating unit 107 (e.g., a brake) can be controlled.

Alternatively, that system can be used to read a highway central division for automatic control of operation, etc.

Besides, the system of this embodiment may be used as sensors to sense other vehicles in front and in the rear, obstacles, white lines, etc.; to detect the positions and directions of the driver and a passenger(s) for prevention of dozing and looking aside while driving; and to actuate an airbag safely while judging whether those on board are children or adults and the positions and directions of their faces.

The stereo imaging unit of the invention could be applied not only to an onboard stereo imaging system but also to robots, railways, airplanes, ships, surveillance cameras, cameras for teleconferencing systems, etc.

In FIG. 9, it is noted that the mirrors 101A and 101B correspond to the first reflecting surfaces 21L, 21R and the second reflecting surfaces 22L, 22R, respectively, in FIGS. 1–8, the objective lens group 101C to the objective lens groups (negative lens groups) 1L, 1R, the image-formation lens group 102A to the image-formation lens group (positive lens group) 3, and the image pickup device 102 to the image pickup device 4.

As can be understood from the foregoing, the present invention can provide a stereo imaging unit comprising a stereo imaging optical system that can afford a suitable parallax and a wide angle-of-view thereto when used with a small-format image pickup device.

It is also possible to provide a stereo imaging unit comprising a small-format stereo imaging optical system that has a large angle of view in the horizontal (parallactic) direction.

Further, it is possible to provide a stereo imaging unit comprising a small-format stereo imaging optical system that has a large angle of view in the horizontal (parallactic) direction, wherein the number of components involved can be much more reduced.

Furthermore, it is possible to provide a stereo imaging unit comprising a stereo imaging optical system capable of making satisfactory correction for aberrations as well as a stereo imaging unit comprising a stereo imaging optical system capable of making efficient use of images having parallaxes on an image pickup device.

What we claim is:

1. A stereo imaging unit comprising a single image pickup device and a stereo imaging optical system capable of forming on said single image pickup device at least two parallactic images having mutual parallaxes, wherein said stereo imaging optical system comprises:
    a first entrance window and a second entrance window that have entrance surfaces located on a subject side and are juxtaposed in a left-and-right direction,
    a plurality of reflecting surfaces for guiding a light beam incident on said first entrance window to said single image pickup device,
    a plurality of reflecting surfaces for guiding a light beam incident on said second entrance window to said single image pickup device,
    a first negative lens group having negative refracting power on the light beam incident on said first entrance window and a first positive lens group that is positioned on an image side of said first negative lens group via a longest air space in a lens system and has positive refracting power, and
    a second negative lens group having negative refracting power on the light beam incident on said second entrance window and a second positive lens group that is positioned on an image side of said second negative lens group via a longest air space in the lens system and has positive refracting power, with satisfaction of conditions (1), (2), (3) and (4):

$$-10.0 < f_{N1}/f_{1T} < -2.0 \quad (1)$$

$$-10.0 < f_{N2}/f_{2T} < -2.0 \quad (2)$$

$$1.5 < f_{P1}/f_{1T} < 10 \quad (3)$$

$$1.5 < f_{P2}/f_{2T} < 10 \quad (4)$$

where $f_{N1}$ is a focal length of said first negative lens group, $f_{N2}$ is a focal length of said second negative lens group, $f_{P1}$ is a focal length of said first positive lens group, $f_{P2}$ is a focal length of said second positive lens group, $f_{1T}$ is a focal length of the stereo imaging optical system including said first negative lens group, and $f_{2T}$ is a focal length of the stereo imaging optical system including said second negative lens group.

2. The stereo imaging unit according to claim 1, which further satisfies conditions (5) and (6):

$$-0.4 < \beta_{P1} < -0.06 \quad (5)$$

$$-0.4 < \beta_{P2} < -0.06 \quad (6)$$

where $\beta_{P1}$ is a transverse magnification of said first positive lens group, and $\beta_{P2}$ is a transverse magnification of said second positive lens group, and $\beta_{P2}$ is a transverse magnification of said second positive lens group.

3. The stereo imaging unit according to claim 1, wherein a stop member to form an exit pupil is positioned in a spacing between said first negative lens group and said first positive lens group, and between said second negative lens group and said second positive lens group.

4. The stereo imaging unit according to claim 3, which satisfies conditions (7) and (8) while an optical path is taken apart:

$$0.03 < D_{PP1}/f_{P1} < 1.5 \quad (7)$$

$$0.03 < D_{PP2}/f_{P2} < 1.5 \quad (8)$$

where $D_{PP1}$ is a distance from said stop member to an entrance surface of said first positive lens group, and $D_{PP2}$ is the distance from said stop member to an entrance surface of said second positive lens group.

5. The stereo imaging unit according to claim 1, wherein while an optical path entered from each entrance window is taken apart, each optical system is constructed as one having a substantially common optical axis, and a lens or a lens subgroup in at least a part of said first positive lens group and said second positive lens group is a singe lens or a lens subgroup that is located in front of said single image pickup device and has a common optical axis.

6. The stereo imaging unit according to claim 5, wherein said plurality of reflecting surfaces are arranged such that parallactic images to be projected on said single image pickup device are projected side by side in a direction of juxtaposition different from that of said first and second entrance windows.

7. The stereo imaging unit according to claim 6, wherein an optical axis of said first negative lens group and an optical axis of said second negative lens group are unparallel with each other, and do not lie in the same plane.

8. The stereo imaging unit according to claim 7, wherein, given that a first chief ray is defined by a center ray of a light beam that reaches a center of a parallactic image projected onto said single image pickup device via said first negative lens group, said plurality of reflecting surfaces and said first positive lens group and a second chief ray is defined by a center ray of a light beam that reaches a center of a parallactic image projected onto said single image pickup device via said second negative lens group, said plurality of reflecting surfaces and said second positive lens group, an angle difference between said first chief ray incident on said first negative lens group and said second chief ray incident on said second negative lens group is smaller than an angle difference between the optical axis of said first negative lens group and the optical axis of said second negative lens group.

9. The stereo imaging unit according to claim 6, wherein an image pickup plane of said single image pickup device is configured in such a rectangular shape as to have a long-side direction and a short-side direction, and the long-side direction of said image pickup plane is inclined with respect to a parallactic direction of said stereo imaging optical system.

10. The stereo imaging unit according to claim 6, wherein said different direction is substantially orthogonal to a parallactic direction of said parallactic images.

11. The stereo imaging unit according to claim 1, wherein an image pickup plane of said single image pickup device is configured in such a rectangular shape as to have a long-side direction and a short-side direction, and said single image pickup device is located such that a parallactic image by way of said first negative lens group and a parallactic image by way of said second negative lens group are projected side by side in the short-side direction of said single image pickup device.

12. The stereo imaging unit according to claim 1, wherein a direction of scanning by said single image pickup device is inclined with respect to a parallactic direction of said stereo imaging optical system.

13. The stereo imaging unit according to claim 1, wherein a direction of scanning by said single image pickup device is substantially parallel with a parallactic direction of the parallactic images.

14. The stereo imaging unit according to claim 1, wherein said single image pickup device is located such that a parallactic image formed via said first negative lens group and a parallactic image formed via said second negative lens group are projected side by side in a direction substantially orthogonal to a direction of scanning by said single image pickup device.

15. The stereo imaging unit according to claim 1, which further comprises field-limitation members for forming said at least two parallactic images on an image pickup plane of said image pickup device in a separate fashion.

16. The stereo imaging unit according to claim 15, wherein at least one of said field-limitation members is said first entrance window and said second entrance window, and a field mask having a substantially rectangular opening.

17. The stereo imaging unit according to claim 16, said field-limitation mask is located at a position eccentric with respect to said first negative lens group and said second lens group.

18. The stereo imaging unit according to claim 1, wherein, given that a first chief ray is defined by a center ray of a light beam that reaches a center of a parallactic image projected onto said single image pickup device via said first negative lens group, said plurality of reflecting surfaces and said first positive lens group and a second chief ray is defined by a center ray of a light beam that reaches a center of a parallactic image projected onto said single image pickup device via said second negative lens group, said plurality of reflecting surfaces and said second positive lens group, a contour of a lens in at least either one of said first negative lens group and said second negative lens group is in a non-rotationally symmetric shape that comes closest to an optical axis of said lens on a side thereof, on which an associated chief ray is not incident.

19. A stereo imaging system, comprising the stereo imaging unit according to claim 1, an image processor that is operable in response to an image from said stereo imaging unit to calculate a subject distance, producing a distance signal and a controller that is operable in response to said distance signal to control other device.

20. The stereo imaging system according to claim 19, wherein said other device is a display device.

21. The stereo imaging system according to claim 19, wherein said other device is an alarm device.

22. The stereo imaging system according to claim 19, wherein said other device is an operating device.

23. A stereo imaging unit comprising a single image pickup device and a stereo imaging optical system for forming at least two parallactic images having mutual parallaxes on said single image pickup device, characterized in that said stereo imaging optical system comprises:

a first objective lens group having negative refracting power, and a second objective lens group having negative refracting power and located with a spacing provided therebetween, an image-formation lens group having positive refracting power and located in an optical path on an image pickup device side with respect to said first objective lens group and said second objective lens group, a 1-$1^{st}$ reflecting surface for reflecting an incident light beam on said first objective lens group toward said second objective lens group and a 1-$2^{nd}$ reflecting surface for reflecting a light beam from said 1-$1^{st}$ reflecting surface toward said image pickup device, and a 2-$1^{st}$ reflecting surface for an incident light beam on said second objective lens group toward said first objective lens group and a 2-$2^{nd}$ reflecting surface for reflecting a light beam from said 2-$1^{st}$ reflecting surface toward said image pickup device, wherein:

said 1-$2^{nd}$ reflecting surface and said 2-$2^{nd}$ reflecting surfaces are located in such a way as to reflect light beams reflected thereat toward a subject, and said single image pickup device is located on a side of the light beams reflected at said 1-$2^{nd}$ reflecting surface and said 2-$2^{nd}$ reflecting surface.

24. The stereo imaging unit according to claim 23, wherein said image-formation lens group is located just in front of said single image pickup device.

25. The stereo imaging unit according to claim 24, wherein said image-formation lens group receives light beams for forming said at least two parallactic images, and has only one optical axis.

26. The stereo imaging unit according to claim 23, wherein said 1-$1^{st}$ reflecting surface, said 1-$2^{nd}$ reflecting surface, said 2-$1^{st}$ reflecting surface and said 2-$2^{nd}$ reflecting surface are arranged such that parallax images to be projected onto said single image pickup device are projected in a direction of juxtaposition different from that of said first objective lens group and said second objective lens group.

27. The stereo imaging unit according to claim 26, wherein, given that a first virtual optical axis is defined by a optical axis of said image-formation lens group as passing through said 1-$2^{nd}$ reflecting surface, said 1-$1^{st}$ reflecting surface and said first objective lens group upon back ray tracing and a second virtual optical axis is defined by an optical axis of said image-formation lens group as passing through said 2-$2^{nd}$ reflecting surface, said 2-$1^{st}$ reflecting surface and said second objective lens group upon back ray tracing, the first virtual optical axis entering said first objective lens group and the second virtual optical axis entering said second objective lens group are unparallel with each other, and do not lie in the same plane.

28. The stereo imaging unit according to claim 26, wherein said first objective lens group and said second objective lens group are each comprised of a lens group with a rotationally symmetric optical axis, and with an optical path taken apart, each optical axis is substantially in alignment with an optical axis of said image-formation lens group, and an optical axis of said first objective lens group and an optical axis of said second objective lens group are unparallel with each other and do not lie in the same plane.

29. The stereo imaging unit according to claim 27, wherein, given that a first chief ray is defined by a center ray of a light beam that reaches a center of a parallactic image projected onto said single image pickup device via said first objective lens group, said 1-$1^{st}$ reflecting surface, said 1-$2^{nd}$ reflecting surface and said image-formation lens group and a second chief ray is defined by a center ray of a light beam that reaches a center of a parallactic image projected onto said single image pickup device via said second objective lens group, said 2-$1^{st}$ reflecting surface, said 2-$2^{nd}$ reflecting surface and said image-formation lens group, an angle difference between said first chief ray incident on said first objective lens group and said second chief ray incident on said second objective lens group is smaller than an angle difference between said first virtual optical axis entering said first objective lens group and said second virtual optical axis entering said second objective lens group.

30. The stereo imaging unit according to claim 28, wherein, given that a first chief ray is defined by a center ray of a light beam that reaches a center of a parallactic image projected onto said single image pickup device via said first objective lens group, said 1-1$^{st}$ reflecting surface, said 1-2$^{nd}$ reflecting surface and said image-formation lens group and a second chief ray is defined by a center ray of a light beam that reaches a center of a parallactic image projected onto said single image pickup device via said second objective lens group, said 2-1$^{st}$ reflecting surface, said 2-2$^{nd}$ reflecting surface and said image-formation lens group, an angle difference between said first chief ray incident on said first objective lens group and said second chief ray incident on said second objective lens group is smaller than an angle difference between an optical axis of said first objective lens group and an optical axis of said second objective lens group.

31. The stereo imaging unit according to claim 26, wherein an image pickup plane of said single image pickup device is configured in such a rectangular shape as to have a long-side direction and a short-side direction, and the long-side direction of said image pickup plane is inclined with respect to a parallactic direction of said stereo imaging optical system.

32. The stereo imaging unit according to claim 26, wherein said different direction is a direction substantially orthogonal to a parallactic direction of said parallactic images.

33. The stereo imaging unit according to claim 23, wherein an image pickup plane of said single image pickup device is configured in such a rectangular shape as to have a long-side direction and a short-side direction, and said single image pickup device is located such that a parallactic image by way of said first objective lens group and a parallactic image by way of said second objective lens group are projected side by side in a short-side direction of said single image pickup device.

34. The stereo imaging unit according to claim 23, wherein a direction of scanning by said single image pickup device is inclined with respect to a parallactic direction of said stereo imaging optical system.

35. The stereo imaging unit according to claim 23, wherein a direction of scanning by said single image pickup device is substantially parallel with a parallactic direction of the parallactic images.

36. The stereo imaging unit according to claim 23, wherein said single image pickup device is located such that a parallactic image formed via said first objective lens group and a parallactic image formed via said second objective lens group are projected side by side in a direction substantially orthogonal to a direction of scanning by said single image pickup device.

37. The stereo imaging unit according to claim 23, which satisfies conditions (11), (12), (13) and (14):

$$-10.0 < f_{T1}/f_1 < -2.0 \tag{11}$$

$$-10.0 < f_{T2}/f_2 < -2.0 \tag{12}$$

$$1.5 < f_K/f_1 < 10 \tag{13}$$

$$1.5 < f_K/f_2 < 10 \tag{14}$$

where $f_{T1}$ is a focal length of said first objective lens group, $f_{T2}$ is a focal length of said second objective lens group, $f_K$ is a focal length of said image-formation lens group, $f_1$ is a focal length of the stereo imaging optical system including said first objective lens group, and $f_2$ is a focal length of the stereo imaging optical system including said second objective lens group.

38. The stereo imaging unit according to claim 23, which further satisfies condition (15):

$$-0.4 < \beta_K < -0.06 \tag{15}$$

where $\beta_K$ is a transverse magnification of said image-formation lens group.

39. The stereo imaging unit according to claim 23, wherein a stop member for forming an exit pupil is interposed between said first and second objective lens groups and said image-formation lens group.

40. The stereo imaging unit according to claim 39, which satisfies condition (16) while an optical path is taken apart:

$$0.03 < D_{PK}/f_K < 1.5 \tag{16}$$

where $D_{PK}$ is a distance from said stop member to an entrance surface of said image-formation lens group, and $f_K$ is a focal length of said image-formation lens group.

41. The stereo imaging unit according to claim 23, which further comprises field-limitation members for forming said at least two parallactic images on an image pickup plane of said image pickup device in a separate fashion.

42. The stereo imaging unit according to claim 41, wherein at least one of said field-limitation members is a field mask that is located on a subject side of said objective lens groups, and has a substantially rectangular opening.

43. The stereo imaging unit according to claim 42, wherein said field mask is located at a position eccentric with respect to optical axes of said objective lens groups.

44. The stereo imaging unit according to claim 23, wherein, given that a first chief ray is defined by a center ray of a light beam that reaches a center of a parallactic image projected onto said single image pickup device via said first objective lens group, said 1-1$^{st}$ reflecting surface, said 1-2$^{nd}$ reflecting surface and said image-formation lens group and a second chief ray is defined by a center ray of a light beam that reaches a center of a parallactic image projected onto said single image pickup device via said second objective lens group, said 2-1$^{st}$ reflecting surface, said 2-2$^{nd}$ reflecting surface and said image-formation lens group, a contour of a lens in at least either one of said first objective lens group and said second objective lens group is in a non-rotationally symmetric shape that comes closest to an optical axis of said lens on a side thereof, on which an associated chief ray is not incident.

45. A stereo imaging system, comprising the stereo imaging unit according to claim 23, an image processor that is operable in response to an image from said stereo imaging unit to calculate a subject distance, producing a distance signal and a controller that is operable in response to said distance signal to control other device.

46. The stereo imaging system according to claim 45, wherein said other device is a display device.

47. The stereo imaging system according to claim 45, wherein said other device is an alarm device.

48. The stereo imaging system according to claim 45, wherein said other device is an operating device.

49. A stereo imaging unit comprising a single image pickup device and a stereo imaging optical system for forming at least two parallactic images having mutual parallaxes on said single image pickup device, wherein said stereo imaging optical system comprises:

an image-formation lens group of positive refracting power, which is located in front of said single image pickup device, receives light beams for forming said at least two parallactic images, and has only one optical axis, a first objective lens group and a second objective lens group, each of which has negative refractive power and which have entrance surfaces facing a subject side and are juxtaposed with a spacing therebetween in a parallactic direction, a first light-guide optical system that includes a 1-$1^{st}$ reflecting surface and a 1-$2^{nd}$ reflecting surface for guiding a light beam incident from a subject thereon via said first objective lens group to said image-formation lens group, and a second light-guide optical system that includes a 2-$1^{st}$ reflecting surface and a 2-$2^{nd}$ reflecting surface for guiding a light beam incident from the subject thereon via said second objective lens group to said image-formation lens group.

50. The stereo imaging unit according to claim 49, wherein said stereo imaging optical system is constructed such that said at least two parallactic images having parallaxes, to be projected onto said single image pickup device, are projected side by side in a direction different from a parallactic direction thereof.

51. The stereo imaging unit according to claim 49, wherein bending of an optical path from said image-formation lens group by said first light-guide optical system and said second light-guide optical system upon back ray tracing is effected by reflections at only four reflecting surfaces; said 1-$1^{st}$ reflecting surface, said 1-$2^{nd}$ reflecting surface, said 2-$1^{st}$ reflecting surface and said 2-$2^{nd}$ reflecting surface.

52. The stereo imaging unit according to claim 49, wherein, given that a first chief ray is defined by a center ray of a light beam that reaches a center of a parallactic image projected onto said single image pickup device via said first objective lens group, said first light-guide optical system and said image-formation lens group and a second chief ray is defined by a center ray of a light beam that reaches a center of a parallactic image projected onto said single image pickup device via said second objective lens group, said second light-guide optical system and said image-formation lens group, said first objective lens group is operable as an optical system for polarizing said first chief ray, and said second objective lens group is operable as an optical system for polarizing said second chief ray.

53. The stereo imaging unit according to claim 52, wherein, given that a first virtual optical axis is defined by an optical axis of said image-formation lens group as passing through said first light-guide optical system and said first objective lens group upon back ray tracing and a second virtual optical axis is defined by an optical axis of said image-formation lens group as passing through said second light-guide optical system and said second objective lens group upon back ray tracing, the first virtual optical axis entering said first objective lens group and the second virtual optical axis entering said second objective lens group are unparallel with each other, and do not lie in the same plane.

54. The stereo imaging unit according to claim 52, wherein said first chief ray incident on said first objective lens group and said second chief ray incident on said second objective lens group lie in substantially the same plane.

55. The stereo imaging unit according to claim 49, wherein said first objective lens group and said second objective lens group are each comprised of a lens group with a rotationally symmetric optical axis; an optical axis of said first objective lens group and an optical axis of said second objective lens group are unparallel with each other and lie at positions of rotational symmetry about an optical axis of said image-formation optical lens; and with an optical path taken apart, the optical axis of each objective lens group is substantially in alignment with the optical axis of said image-formation lens group.

56. The stereo imaging unit according to claim 53, wherein an angle difference between said first chief ray incident on said first objective lens group and said second chief ray incident on said second objective lens group is smaller than an angle difference between said first virtual optical axis entering said first objective lens group and said second virtual optical axis entering said second objective lens group.

57. The stereo imaging unit according to claim 55, wherein an angle difference between the said first chief ray incident on said first objective lens group and said second chief ray incident on said second objective lens group is smaller than an angle difference between an optical axis of said first objective lens group and an optical axis of said second objective lens group.

58. The stereo imaging unit according to claim 50, wherein an image pickup plane of said single image pickup device is configured in such a rectangular shape as to have a long-side direction and a short-side direction, and the long-side direction of said image pickup plane is inclined with respect to a parallactic direction of said stereo imaging optical system.

59. The stereo imaging unit according to claim 50, wherein said direction different from the direction of juxtaposition of parallactic images on said single image pickup device is substantially orthogonal to the parallactic direction of said parallactic images.

60. The stereo imaging unit according to claim 49, wherein an image pickup plane of said single image pickup device is configured in such a rectangular shape as to have a long-side direction and a short-side direction, and said single image pickup device is located such that a parallactic image by way of said first objective lens group and a parallactic image by way of said second objective lens group are projected side by side in the short-side direction of said single image pickup device.

61. The stereo imaging unit according to claim 50, wherein a direction of scanning by said single image pickup device is inclined with respect to a parallactic direction of said stereo imaging optical system.

62. The stereo imaging unit according to claim 50, wherein a direction of scanning by said single image pickup device is substantially parallel with a parallactic direction of the parallactic images.

63. The stereo imaging unit according to claim 49, wherein said single image pickup device is located such that a parallactic image formed via said first objective lens group and a parallactic image formed via said second objective lens group are projected side by side in a direction substantially orthogonal to a direction of scanning by said single image pickup device.

64. The stereo imaging unit according to claim 49, which satisfies conditions (11), (12), (13) and (14):

$$-10.0 < f_{T1}/f_1 < -2.0 \quad (11)$$

$$-10.0 < f_{T2}/f_2 < -2.0 \quad (12)$$

$$1.5 < f_K/f_1 < 10 \quad (13)$$

$$1.5 < f_K/f_2 < 10 \quad (14)$$

where $f_{T1}$ is a focal length of said first objective lens group, $f_{T2}$ is a focal length of said second objective lens group, $f_K$ is a focal length of said image-formation lens group, $f_1$ is a focal length of the stereo imaging optical system including said first objective lens group, and $f_2$ is a focal length of the stereo imaging optical system including said second objective lens group.

65. The stereo imaging unit according to claim 49, which further satisfies condition (15):

$$-0.4 < \beta_K < -0.06 \quad (15)$$

where $\beta_K$ is a transverse magnification of said image-formation lens group.

66. The stereo imaging unit according to claim 49, wherein a stop member for forming an exit pupil is interposed between said first and second objective lens groups and said image-formation lens group.

67. The stereo imaging unit according to claim 66, which satisfies condition (16) while an optical path is taken apart:

$$0.03 < D_{PK}/f_K < 1.5 \quad (16)$$

where $D_{PK}$ is a distance from said stop member to an entrance surface of said image-formation lens group, and $f_K$ is a focal length of said image-formation lens group.

68. The stereo imaging unit according to claim 49, which further comprises field-limitation members for forming said at least two parallactic images on an image pickup plane of said image pickup device in a separate fashion.

69. The stereo imaging unit according to claim 68, wherein at least one of said field-limitation members is a field mask that is located on a subject side of said objective lens groups, and has a substantially rectangular opening.

70. The stereo imaging unit according to claim 69, wherein said field mask is located at a position eccentric with respect to optical axes of said objective lens groups.

71. The stereo imaging unit according to claim 49, wherein, given that a first chief ray is defined by a center ray of a light beam that reaches a center of a parallactic image projected onto said single image pickup device via said first objective lens group, said first light-guide optical system and said image-formation lens group and a second chief ray is defined by a center ray of a light beam that reaches a center of a parallactic image projected onto said single image pickup device via said second objective lens group, said second light-guide optical system and said image-formation lens group, a contour of a lens in at least either one of said first objective lens group and said second objective lens group is in a non-rotationally symmetric shape that comes closest to an optical axis of said lens group on a side thereof on which an associated chief ray is not incident.

72. A stereo imaging system, comprising the stereo imaging unit according to claim 49, an image processor that is operable in response to an image from said stereo imaging unit to calculate a subject distance, producing a distance signal and a controller that is operable in response to said distance signal to control other device.

73. The stereo imaging system according to claim 72, wherein said other device is a display device.

74. The stereo imaging system according to claim 72, wherein said other device is an alarm device.

75. The stereo imaging system according to claim 72, wherein said other device is an operating device.

* * * * *